United States Patent
Okamura et al.

(10) Patent No.: US 9,501,158 B2
(45) Date of Patent: Nov. 22, 2016

(54) STORAGE MEDIUM HAVING STORED THEREON INFORMATION PROCESSING PROGRAM AND INFORMATION PROCESSING APPARATUS

(75) Inventors: Yuichiro Okamura, Kyoto (JP); Yoshinori Konish, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 2107 days.

(21) Appl. No.: 12/621,813

(22) Filed: Nov. 19, 2009

(65) Prior Publication Data

US 2011/0065488 A1 Mar. 17, 2011

(30) Foreign Application Priority Data

Sep. 15, 2009 (JP) .................. 2009-213343

(51) Int. Cl.
*A63F 13/02* (2006.01)
*G06F 3/0346* (2013.01)
*A63F 13/428* (2014.01)
*A63F 13/211* (2014.01)
*A63F 13/812* (2014.01)

(52) U.S. Cl.
CPC .......... *G06F 3/0346* (2013.01); *A63F 13/211* (2014.09); *A63F 13/428* (2014.09); *A63F 13/812* (2014.09)

(58) Field of Classification Search
USPC ................................. 345/156–178
See application file for complete search history.

(56) References Cited

U.S. PATENT DOCUMENTS

| | | | |
|---|---|---|---|
| 2004/0021664 A1* | 2/2004 | Takemoto | G06T 19/006 345/419 |
| 2007/0213109 A1* | 9/2007 | Sato | A63F 13/10 463/3 |
| 2007/0265104 A1* | 11/2007 | Haga | G10H 1/348 473/37 |
| 2007/0266181 A1 | 11/2007 | Watanabe | |
| 2008/0255795 A1 | 10/2008 | Shkolnikov | |
| 2009/0209344 A1 | 8/2009 | Okamura | |

FOREIGN PATENT DOCUMENTS

| | | |
|---|---|---|
| JP | 2007-260116 | 10/2007 |
| JP | 2000-308756 | 11/2007 |
| JP | 2008-269650 | 11/2008 |
| JP | 4255510 | 2/2009 |

* cited by examiner

Primary Examiner — Carolyn R Edwards
(74) Attorney, Agent, or Firm — Nixon & Vanderhye P.C.

(57) ABSTRACT

A data obtaining unit repeatedly obtains acceleration data. An acceleration vector generation unit generates first acceleration vector in accordance with first acceleration data obtained by the data obtaining unit, and generates second acceleration vector in accordance with second acceleration data time-sequentially obtained by the data obtaining unit following the first acceleration data. A cross product direction calculation unit calculates a direction of a cross product between the first acceleration vector and the second acceleration vector. A swing direction identification unit identifies a swing direction in which the input device is swung in accordance with the direction of the cross product.

19 Claims, 18 Drawing Sheets

F I G. 7
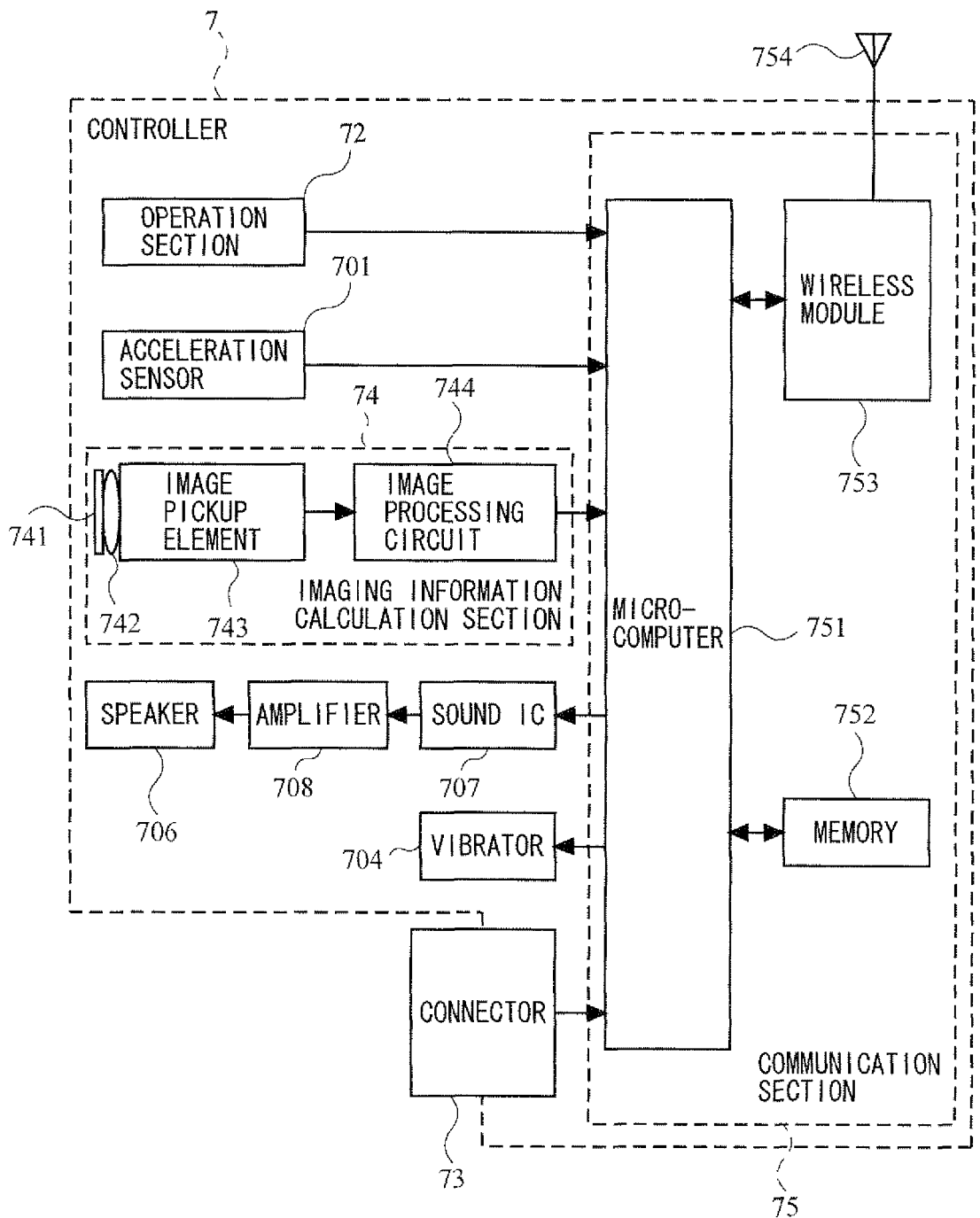

F I G. 8
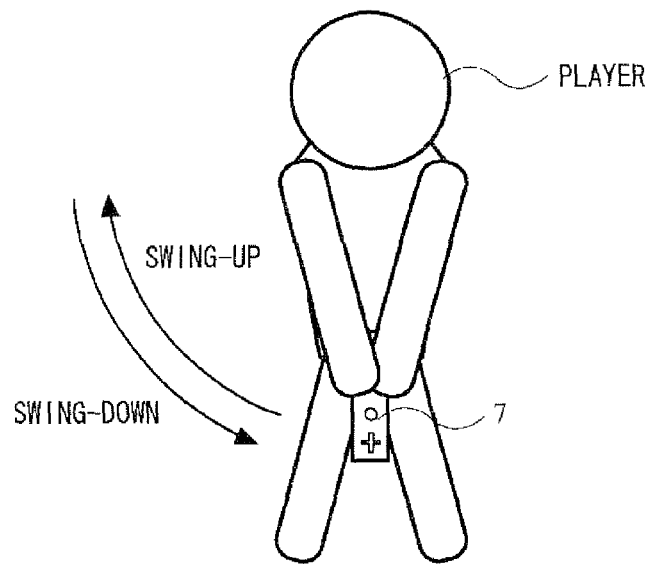
F I G. 9
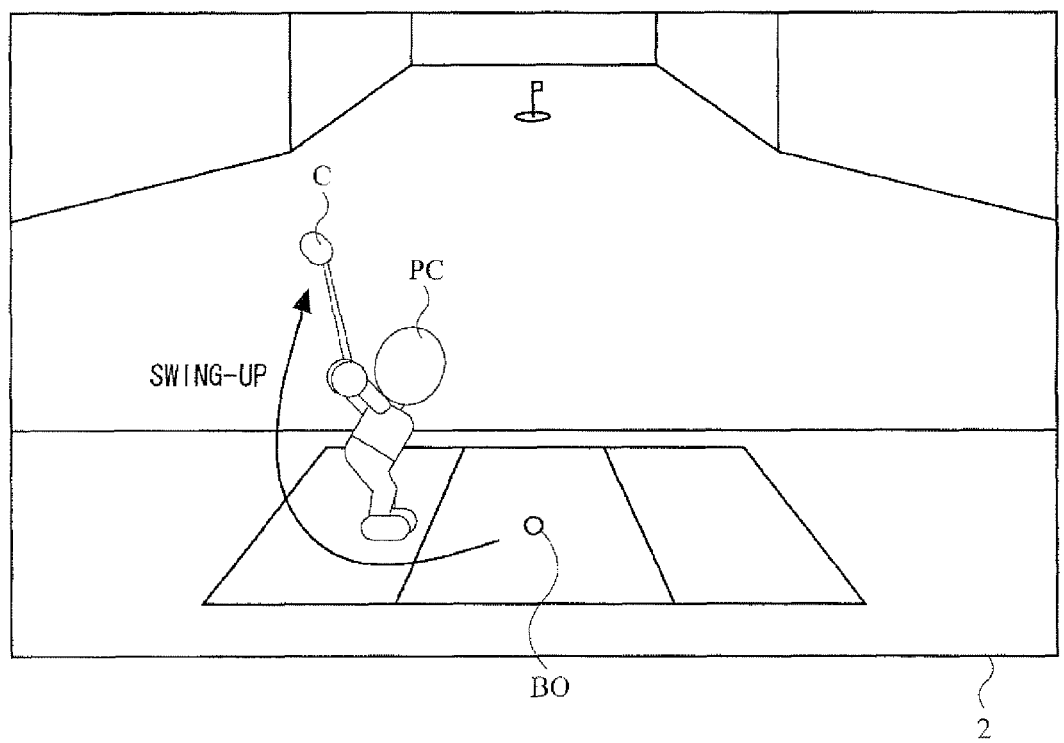

F I G. 10
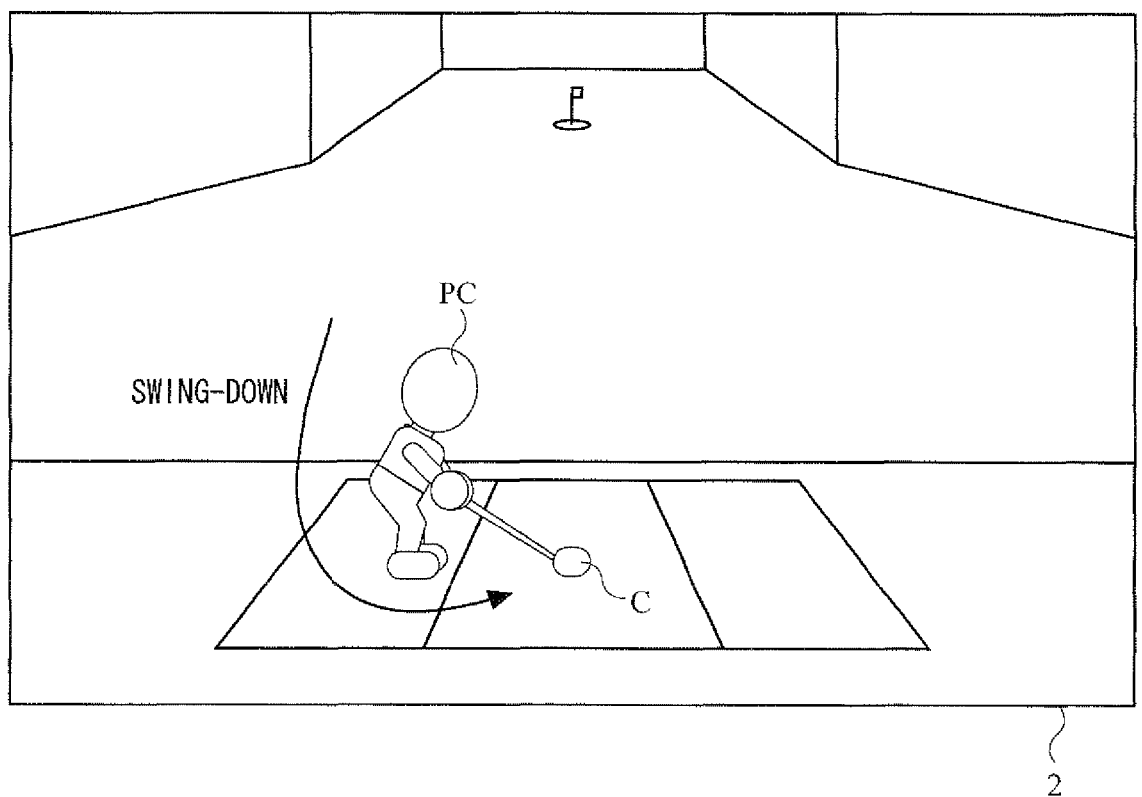

F I G. 1 6
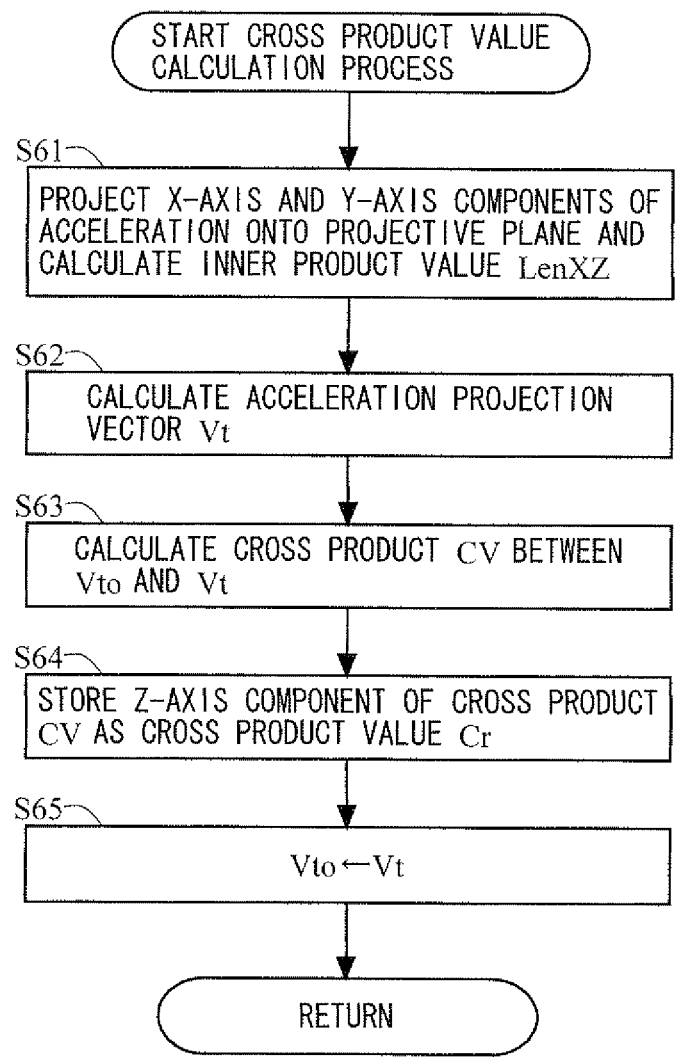

STORAGE MEDIUM HAVING STORED THEREON INFORMATION PROCESSING PROGRAM AND INFORMATION PROCESSING APPARATUS

CROSS REFERENCE TO RELATED APPLICATION

The disclosure of Japanese Patent Application No. 2009-213343, filed Sep. 15, 2009, is incorporated herein by reference.

BACKGROUND AND SUMMARY

1. Technical Field

The technology presented herein relates to a storage medium having stored thereon an information processing program and an information processing apparatus, and more particularly to a storage medium having stored thereon an information processing program and an information processing apparatus which process acceleration data outputted from an acceleration detection section which detects, for example, acceleration along at least two axis directions applied to an input device.

2. Description of the Background Art

As disclosed in Japanese Laid-Open Patent Publication No. 2000-308756 (hereinafter referred to as Patent Document 1), for example, conventionally known is an input control device for a game apparatus which includes an input device provided with an acceleration sensor, so as to detect a moving direction of the input device of a stick shape. In the above game apparatus, a direction in which the input device held by a user is swung is identified, and a game process is performed based on the direction. For example, it may be considered that, by using translational acceleration which is obtained by subtracting a gravitational acceleration component from acceleration applied to the input device while the input device is being swung, the direction in which the input device is swung is identified.

Here, in order to obtain the translational acceleration of the input device, the gravitational acceleration applied to the input device needs to be extracted. However, since acceleration applied to the input device represents a combined value between the translational acceleration and the gravitational acceleration, it is difficult to accurately calculate the gravitational acceleration component only, and thus such calculation is based on estimation to some degree. Accordingly, it is also difficult to accurately obtain the translational acceleration by subtracting the gravitational acceleration, which is obtained based on the estimation, from the acceleration applied to the input device, and as a result, the direction in which the input device is swung cannot be identified accurately.

SUMMARY

Therefore, a feature of the technology presented herein is to provide a storage medium having stored thereon an information processing program and an information processing apparatus which are capable of accurately identifying, by using acceleration applied to an input device, a direction in which the input device is swung.

The present technology has the following features to attain the above.

A first aspect of the present technology is a computer readable storage medium having stored thereon an information processing program executed on a computer of an information processing apparatus which executes a process using acceleration data outputted from an acceleration sensor detecting acceleration along at least two axis directions applied to an input device. The information processing program causes the computer to function as data obtaining means, acceleration vector generation means, cross product direction calculation means, and swing direction identification means. The data obtaining means repeatedly obtains the acceleration data. The acceleration vector generation means generates first acceleration vector in accordance with first acceleration data obtained by the data obtaining means, and generates second acceleration vector in accordance with second acceleration data obtained by the data obtaining means time-sequentially following the first acceleration data. The cross product direction calculation means calculates a direction of a cross product between the first acceleration vector and the second acceleration vector. The swing direction identification means identifies a swing direction in which the input device is swung in accordance with the direction of the cross product.

According to above, the swing direction in which the input device is swung is identified by using the direction of the cross product of the acceleration vector, and thus it is possible to accurately identify the swing direction in which the input device is swung by using the acceleration applied to the input device.

Further, the swing direction identification means may identify the swing direction in which the input device is swung in accordance with whether the direction of the cross product is a first direction or a second direction that is reverse of the first direction.

Further, the swing direction identification means may identify that the swing direction in which the input device is swung is a third direction when the direction of the cross product is the first direction, and identify that the swing direction in which the input device is swung is a fourth direction, which is reverse of the third direction, when the direction of the cross product is the second direction.

According to above, it is possible to identify the swing direction in which the input device is swung depending on a condition satisfied by the direction of the cross product.

Further, the cross product direction calculation means may include cross product value calculation means. The cross product direction calculation means calculates a cross product value indicative of a component of a cross product, in a predetermined direction, between the first acceleration vector and the second acceleration vector. In this case, the swing direction identification means may identify the swing direction in which the input device is swung in accordance with the cross product value.

Further, the swing direction identification means may identify the swing direction in which the input device is swung in accordance with whether the cross product value is negative or positive.

According to above, it is possible easily identify the swing direction in which the input device is swung depending on a condition satisfied by the cross product value.

Further, the cross product direction calculation means may include cross product value calculation means, first threshold determination means, and second threshold determination means. The cross product value calculation means calculates a cross product value indicative of a component of a cross product, in a predetermined direction, between the first acceleration vector and the second acceleration vector. The first threshold determination means determines whether or not the cross product value is less than a first threshold which is a negative value set in advance. The second threshold determination means determines whether or not the cross product value is greater than a second threshold which is a positive value and which has an absolute value different from the first threshold. In this case, the swing direction identification means may identify that the swing direction in which the input device is swung is the third direction when the first threshold determination means determines that the cross product value is less than the first threshold, and identify that the swing direction in which the input device is swung is the fourth direction when the second threshold determination means determines that the cross product value is greater than the second threshold.

According to above, in accordance with the magnitude of the absolute values of the first threshold and the second threshold, it is possible to adjust response in identifying the swing direction for each swing direction in which the input device is swung.

Further, when the first threshold determination means determines that the cross product value is equal to or greater than the first threshold and when the second threshold determination means determines that the cross product value is equal to or less than the second threshold, the swing direction identification means may identify that the input device is not being swung.

According to above, it is possible to eliminate effects of noise on the acceleration detected by the acceleration sensor, and also possible prevent frequent switching of the swing direction identified even if the acceleration shifts around the thresholds.

Further, the acceleration sensor may detect acceleration along at least three axis directions applied to the input device, and output acceleration data corresponding to the acceleration. The acceleration vector generation means may set a predetermined projective plane in a space defined by the three axes as coordinate axes, and project first acceleration indicated by the first acceleration data and second acceleration indicated by the second acceleration data onto the projective plane, so as to generate the first acceleration vector and the second acceleration vector.

According to above, the acceleration vector projected on a predetermined projective plane is used, whereby it is possible accurately analyze shifts in the acceleration vector.

Further, the acceleration sensor may detect acceleration along at least three axis directions applied to the input device, and output acceleration data corresponding to the acceleration. The acceleration vector generation means may set, in a space defined by the three axes as coordinate axes, a projective plane so as to be non-parallel to an axis of swing rotation supposedly defined for the input device swung in the third direction and in the fourth direction, and project first acceleration indicated by the first acceleration data and second acceleration indicated by the second acceleration data, which are arranged in the space, onto the projective plane, and generate the first acceleration vector and the second acceleration vector.

Further, the acceleration vector generation means may set the projective plane, in the space, so as to be substantially perpendicular to the axis of swing rotation.

According to above, the projective plane is set so as to be nonparallel to the axis of swing rotation supposedly defined for the input device, whereby it is possible accurately analyze the shift in the acceleration vector.

Further, the acceleration sensor may detect acceleration along at least three axis directions applied to the input device, and output acceleration data corresponding to the acceleration. A trajectory of acceleration, which is detected by the acceleration sensor and is drawn in a space defined by the three axes as the coordinate axes when the input device is swung in the third direction, may be drawn substantially in a circle shape, when projected onto a predetermined plane. A trajectory of acceleration, which is detected by the acceleration sensor and is drawn in the space when the input device is swung in the fourth direction, may be drawn, when projected onto the predetermined plane, substantially in a circle shape in a direction reverse of a direction of the trajectory obtained when the input device is swung in the third direction. In this case, the acceleration vector generation means sets a projective plane so as to be substantially non-perpendicular to the predetermined plane, and projects first acceleration indicated by the first acceleration data and second acceleration indicated by the second acceleration data, which are arranged in the space, onto the projective plane, and generates the first acceleration vector and the second acceleration vector.

Further, the acceleration vector generation means may set the projective plane so as to be substantially parallel to the predetermined plane.

According to above, the projective plane is set so as to be substantially non-perpendicular to an expected shape of the trajectory of the acceleration, whereby it is possible to accurately analyze the shift in the acceleration vector.

Further, the acceleration vector generation means may generate the first acceleration vector by using a value obtained by projecting components of two axis directions, among components of the three axis directions of the first acceleration, onto the projective plane, and a value of a component of a remaining one axis direction, and generate the second acceleration vector by using a value obtained by projecting components of two axis directions of the second acceleration onto the projective plane, and a value of a component of a remaining one axis direction of the second acceleration.

According to above, by using the acceleration vector obtained by projecting components of two axis direction, among three axis directions, onto a predetermined projective plane, it is possible accurately analyze the shift in the acceleration vector.

Further, the information processing program may cause the computer to function as angle calculation means and display control means. The angle calculation means calculates an angle relative to a swing direction identified by the swing direction identification means, in accordance with the cross product value calculated by the cross product value calculation means. The display control means arranges, in accordance with an angle calculated by the angle calculation means, an object in a virtual world, at the angle, and displays the object on a display device.

According to above, by using the cross product value of the acceleration vector for identifying the swing direction in which the input device is swung, it is possible to calculate the angle relative to the direction.

Further, the angle calculation means may calculate an angular velocity in the swing direction identified by the swing direction identification means, in accordance with the cross product value calculated by the cross product value calculation means, and calculate the angle in accordance with the angular velocity.

According to above, by using the cross product value of the acceleration vector for identifying the swing direction in which the input device is swung, it is possible to easily calculate the angle relative to the direction.

Further, the angle calculation means may calculate angular acceleration in the swing direction identified by the swing direction identification means, in accordance with the cross product value calculated by the cross product value calculation means, and calculate the angular velocity in accordance with the angular acceleration.

According to above, angular acceleration relative to the direction is calculated by using the cross product value of the acceleration vector for identifying the swing direction in which the input device is swung, whereby it is possible to easily calculate the angular velocity relative to the direction.

A second aspect of the present technology may be embodied in a form of an information processing apparatus.

According to the present technology, the swing direction in which the input device is swung is identified by using the cross product of the acceleration vector, and thus it is possible to accurately identify the direction in which the input device is swing by using the acceleration applied to the input device.

These and other features, aspects and advantages of the present technology will become more apparent from the following detailed description of the present technology when taken in conjunction with the accompanying drawings.

BRIEF DESCRIPTION OF THE DRAWINGS

FIG. 7 is a block diagram showing a configuration of the controller 7 shown in FIG. 3;

FIG. 8 is a diagram illustrating an exemplary state where a game operation is performed by using the controller 7 shown in FIG. 1;

FIG. 9 is a diagram showing an example of a game image displayed on a monitor 2 shown in FIG. 1;

FIG. 10 is a diagram showing another example of the game image displayed on the monitor 2 shown in FIG. 1;

FIG. 16 is a subroutine showing an example of a cross product value calculation process in step 43 shown in FIG. 15;

DESCRIPTION OF THE PREFERRED EMBODIMENTS

Figure 1:
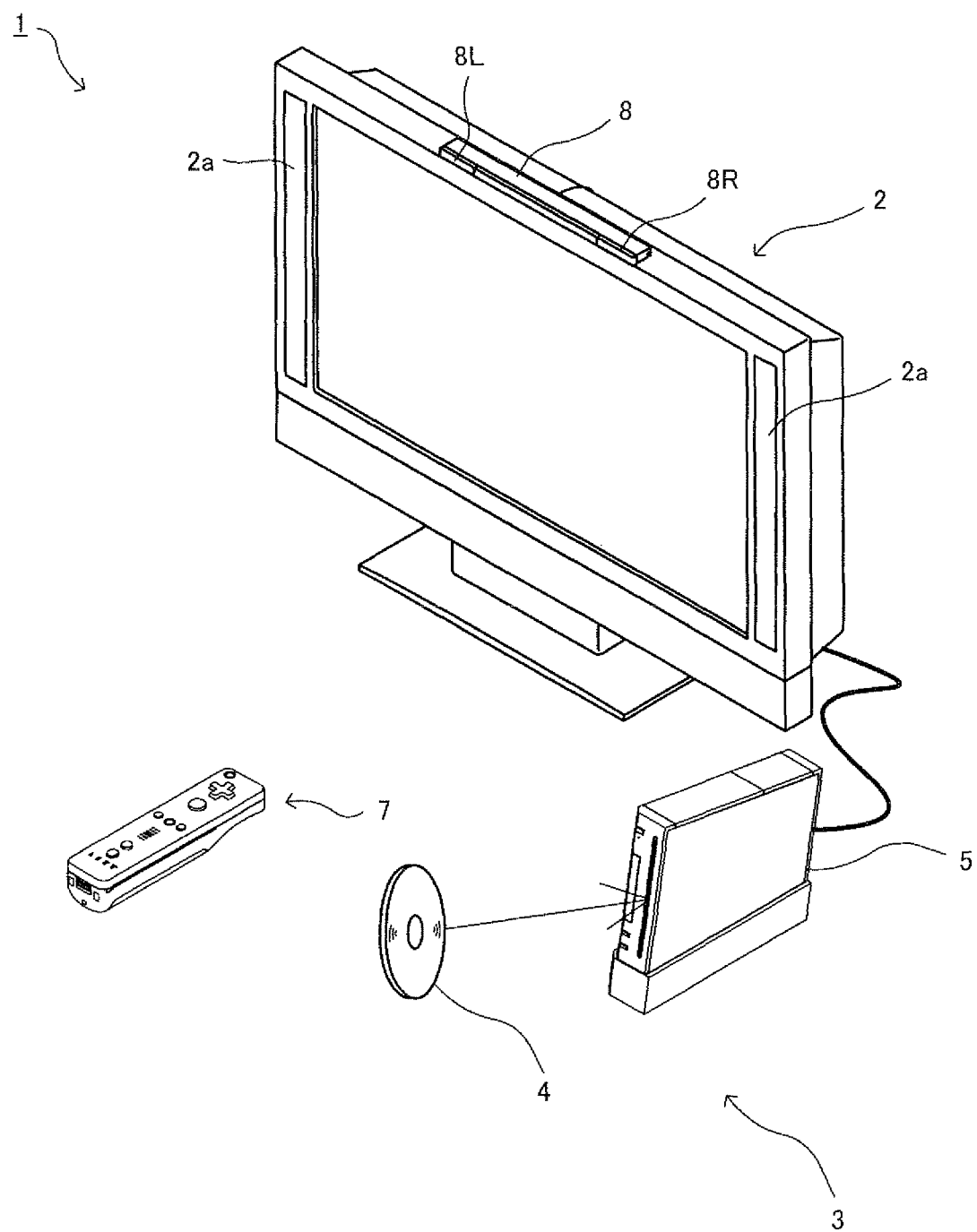
FIG. 1 is an outer appearance illustrating a game system 1 according to one embodiment.
Figure 2:
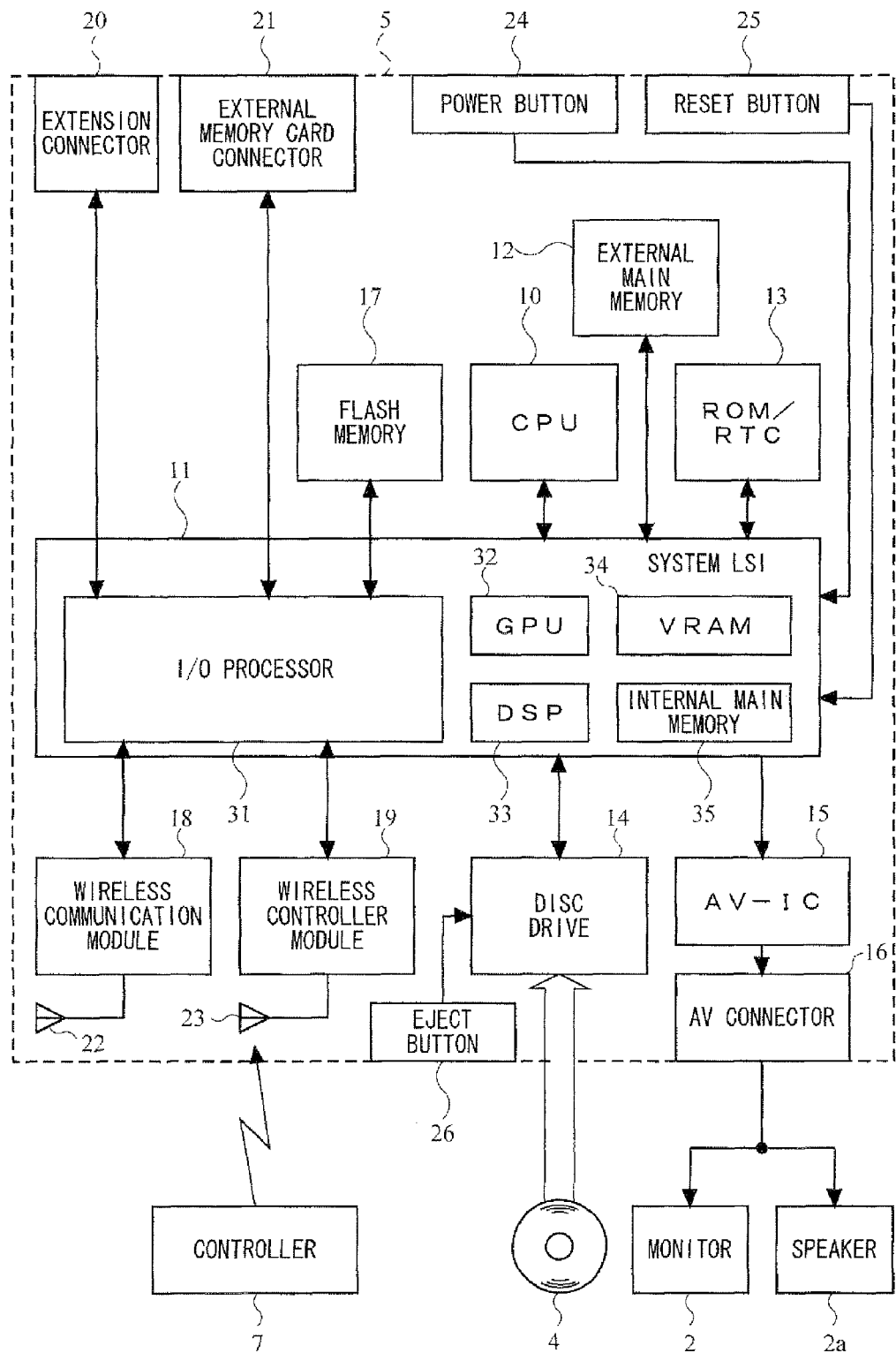
FIG. 2 is a functional block diagram of a game apparatus body 5 shown in FIG. 1.

With reference to FIG. 1, an information processing apparatus executing an information 1 processing program according to one embodiment will be described. For the sake of detailed description, a stationary game apparatus body 5 is used as an example of the information processing apparatus, and a game system which includes the game apparatus body 5 will be described. FIG. 1 is an outer appearance of an exemplary game system 1 which includes a stationary game apparatus 3. FIG. 2 is a block diagram showing an example of the game apparatus body 5. Hereinafter, the game system 1 will be described.

In FIG. 1, the game system 1 includes a home television receiver (hereinafter referred to as a monitor) 2, which is exemplary display means, and a stationary game apparatus 3 which is connected to the monitor 2 via a connection cord. The monitor 2 includes speakers 2a for outputting sound based on an audio signal outputted from the game apparatus 3. Further, the game apparatus 3 includes an optical disc 4 having stored thereon a program (e.g., a game program), which is an exemplary information processing program of the present technology, the game apparatus body 5 including a computer for executing the game program stored on the optical disc 4 so as to output and display a game screen on the monitor 2, and a controller 7 for providing the game apparatus body 5 with operational information necessary for a game in which a character or the like displayed on the game screen is operated.

The game apparatus body 5 incorporates therein a wireless controller module 19 (see FIG. 2). The wireless controller module 19 receives data wirelessly transmitted from the controller 7, and also transmits data from the game apparatus body 5 to the controller 7, thereby connecting the controller 7 and the game apparatus body 5 via wireless communication. Further, the optical disc 4, which is an exemplary information storage medium exchangeably used to the game apparatus body 5, is detachably inserted into the game apparatus body 5.

The game apparatus body 5 also incorporates therein a flash memory 17 (see FIG. 2) which functions as a backup memory for fixedly storing data such as save data. When a game program or the like stored on the optical disc 4 is executed, the game apparatus body 5 displays a result of the execution as a game image on the monitor 2. Further, the game program or the like need not be necessarily stored on the optical disc 4, but may be stored in advance in the flash memory 17 and executed. Still further, the game apparatus body 5 uses save data stored in the flash memory 17 so as to reproduce a state of a game played in the past, thereby displaying an image of the game on the monitor 2. A player playing with the game apparatus 3 can enjoy the game by operating the controller 7 while watching the image of the game displayed on the monitor 2.

The controller 7 uses a technology of Bluetooth (registered trademark), for example, and wirelessly transmits transmission data such as operation information to the game apparatus body 5 incorporating therein the wireless controller module 19. The controller 7 is operating means mainly used for operating a player object or the like displayed on a display of the monitor 2. The controller 7 has a housing which is small enough to be held by one hand, and a plurality of operation buttons (including a cross key, a stick, and the like) exposed at a surface of the housing. Further, as described later in detail, the controller 7 includes an imaging information calculation section 74 for taking an image viewed from the controller 7. As exemplary imaging targets of the imaging information calculation section 74, two LED modules (hereinafter referred to as markers) 8L and 8R are provided in the vicinity of the display screen of the monitor 2. The markers 8L and 8R, for example, output infrared light forward from the monitor 2, respectively. Further, in the controller 7, the communication section 75 receives transmission data wirelessly transmitted from the wireless controller module 19 of the game apparatus body 5, whereby sound or vibration based on the transmission data is generated.

Next, with reference to FIG. 2, an internal configuration of the game apparatus body 5 will be described. FIG. 2 is a block diagram showing a configuration of the game apparatus body 5. The game apparatus body 5 has a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15, and the like.

The CPU 10 performs a game process by executing a game program stored on the optical disc 4, and acts as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processes such as control of data transmission among component parts connected to the system LSI 11, generation of an image to be displayed, and acquisition of data from external devices. An internal configuration of the system LSI 11 will be described later. The external main memory 12, which is a volatile memory, stores therein such a program as a game program loaded from the optical disc 4 or a game program loaded from the flash memory 17, and various data. The external main memory 12 is used as a work area or a buffer area of the CPU 10. The ROM/RTC 13 has a ROM (so called a boot ROM) incorporating a program for booting up the game apparatus body 5, and a clock circuit (RTC) for counting time. The disc drive 14 reads program data, texture data, and the like from the optical disc 4, and writes the read data into an internal main memory 35 to be described later or the external main memory 12.

Further, provided to the system LSI 11 are an input/output processor 31, a GPU (Graphics Processor Unit) 32, a DSP (Digital Signal Processor) 33, a VRAM (Video RAM) 34, and the internal main memory 35. Although not shown in drawings, these component parts 31 to 35 are connected to one another via an internal bus.

The GPU 32 functions as a part of drawing means, and generates an image in accordance with a graphics command (draw command) from the CPU 10. The VRAM 34 stores therein data (such as polygon data and texture data) necessary for the GPU 32 to execute the graphics command. When an image is to be generated, the GPU 32 uses data stored in the VRAM 34 and generates image data.

The DSP 33 functions as an audio processor, and generates audio data by using sound data and sound waveform (tone quality) data stored in the internal main memory 35 or the external main memory 12.

The image data and the audio data generated as described above are read by the AV-IC 15. The AV-IC 15 outputs the read image data to the monitor 2 via the AV connector 16, and also outputs the read audio data to the speakers 2a provided on the monitor 2. Accordingly, the image is displayed on the monitor 2, and the sound is outputted from the speakers 2a.

The input/output (I/O) processor 31 executes transmission of data between component parts connected to the I/O processor 31, and also executes downloading of data from external devices. The I/O processor 31 is connected to the flash memory 17, the wireless communication module 18, the wireless controller module 19, an expansion connector 20, and an external memory card connector 21. An antenna 22 is connected to the wireless communication module 18, and an antenna 23 is connected to the wireless controller module 19.

The I/O processor 31 is connected to a network via the wireless communication module 18 and the antenna 22, and is capable of communicating with another game apparatus and various servers connected to the network. The I/O processor 31 accesses the flash memory 17 on a regular basis so as to detect data, if any, which is necessary to be transmitted to the network. If the data is detected, the detected data is transmitted to the network via the wireless communication module 18 and the antenna 22. The I/O processor 31 receives data transmitted from another game apparatus and data downloaded from a download server, via the network, the antenna 22, and the wireless communication module 18, and stores the received data in the flash memory 17. The CPU 10 executes the game program, and reads the data stored in the flash memory 17 to be used while executing the game program. In the flash memory 17, not only data transmitted between the game apparatus body 5 and another game apparatus or various servers, but also save data (result data or progress data) of a game played by using the game apparatus body 5 may be stored.

The I/O processor 31 also receives operation data and the like, which is transmitted from the controller 7 (controller 7) via the antenna 23 and the wireless controller module 19, and (temporarily) stores the operation data in the internal main memory 35 or in the buffer area of the external main memory 12. As with the external main memory 12, the internal main memory 35 may be used for storing the game programs read from the optical disc 4 or from the flash memory 17, and various data, and may be used as the work area or the buffer area of the CPU 10.

The expansion connector 20 and the external memory card connector 21 are connected to the I/O processor 31. The expansion connector 20 is an interface connector as typified by a USB and an SCSI, and is capable of performing communication with the network, instead of the wireless communication module 18, by connecting thereto a medium such as an external storage medium, a peripheral device such as another controller, or a wired communication connector. The external memory card connector 21 is a connector for connecting thereto the external storage medium such as a memory card. For example, the I/O processor 31 accesses the external storage medium via the expansion connector 20 or the external memory card connector 21, and then saves data or reads data.

Provided to (for example, on the front main surface of) the game apparatus body 5 are a power button 24 for the game apparatus body 5, a reset button 25 for a game process, an insertion slot in which the optical disc 4 is inserted, an eject button 26 for causing the optical disc 4 to be ejected from the insertion slot of the game apparatus body 5, and the like. The power button 24 and the reset button 25 are connected to the system LSI 11. When the power button 24 is turned on, power is supplied to each of the component parts of the game apparatus body 5 via an AC adaptor, which is not shown. When the reset button 25 is pressed, the system LSI 11 reboots the boot-up program of the game apparatus body 5. The eject button 26 is connected to the disc drive 14. When the eject button 26 is pressed, the optical disc 4 is ejected from the disc drive 14.

Figure 3:
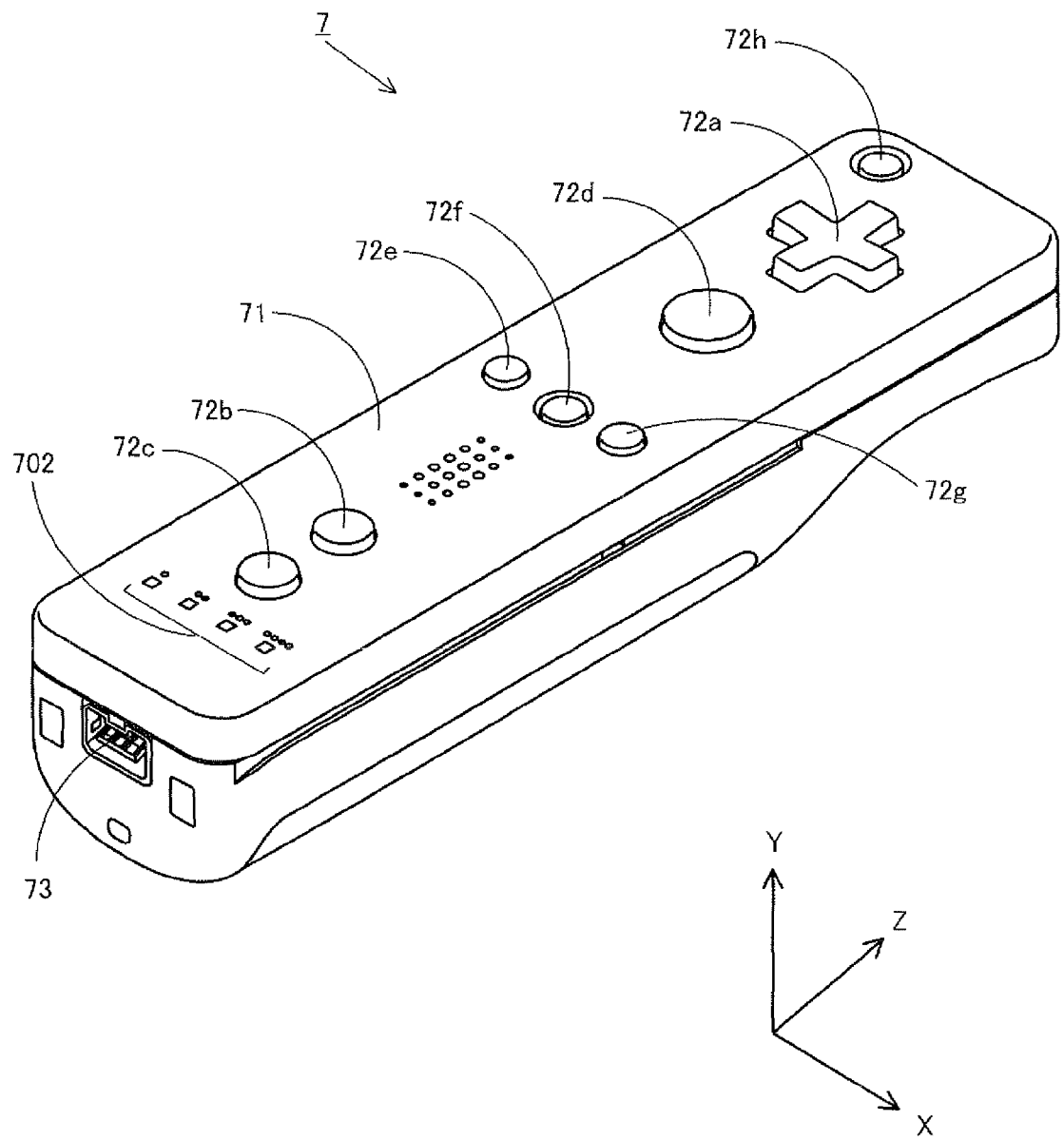
FIG. 3 is a perspective view of a controller 7 shown in FIG. 1 as viewed from a top rear side thereof.
Figure 4:
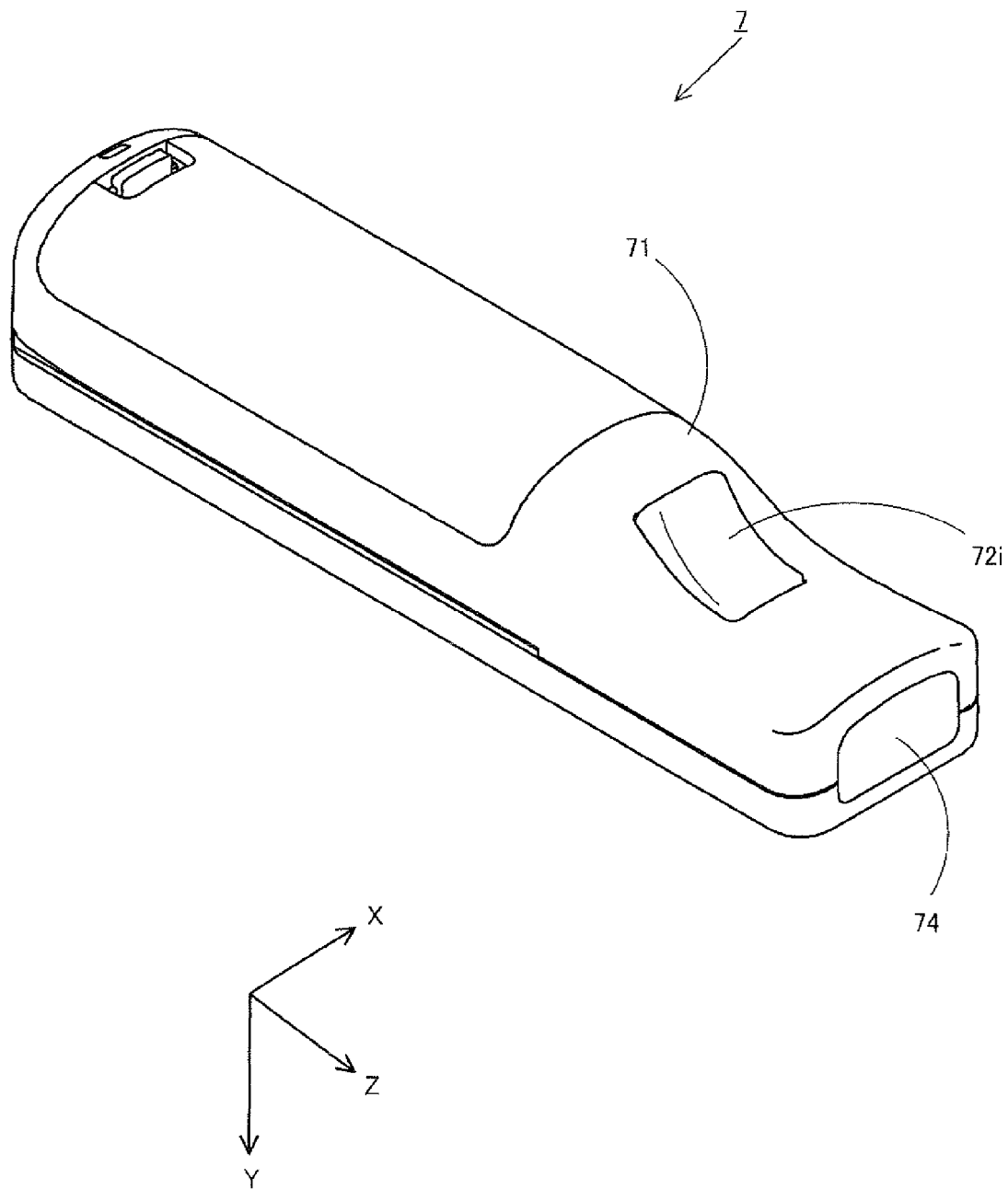
FIG. 4 is a perspective view of a controller 7 shown in FIG. 3 as viewed from a bottom front side thereof.

With reference to FIG. 3 and FIG. 4, the controller 7 will be described. FIG. 3 is an exemplary perspective view of the controller 7 as viewed from a top rear side thereof. FIG. 4 is an exemplary perspective view of the controller 7 as viewed from a bottom front side thereof.

As shown in FIG. 3 and FIG. 4, the controller 7 includes a housing 71 which is formed by plastic molding, for example, and a plurality of operation sections 72 are provided on the housing 71. The housing 71 has a substantially parallelepiped shape extending in a longitudinal direction from front to rear, and an overall size thereof is small enough to be held by one hand of an adult or even of a child.

At a front center portion of a top surface of the housing 71, a cross key 72a is provided. The cross key 72a is a cross-shaped four direction push switch, and operation portions thereof are respectively located on cross-shaped projecting portions arranged at intervals of 90° such that the operation portions correspond to four directions (front, rear, right, and left). A player selects one of the front, rear, right, and left directions by pressing one of the operation portions of the cross key 72a. Through an operation of the cross key 72a, the player can indicate a direction in which a player character or the like appearing in a virtual game world is to move, or select an instruction from a plurality of choices.

The cross key 72a is an operation section for outputting an operation signal in accordance with a direction input operation performed by the player as described above, and the operation section may be provide in another form.

For example, the operation section may be provided such that four push switches are arranged in the cross directions and an operation signal is outputted by the player's pressing one of the four push switches. Further, in addition to the four push switches, a center switch may be provided at a crossing portion of the above-described cross directions so as to provide an operation section composed of the four push switches and a center switch. Alternatively, the cross key 72a may be replaced with an operation section which includes an inclinable stick (so called a joystick) projecting from the top surface of the housing 71 and which outputs the operation signal in accordance with an inclining direction of the stick. Still alternatively, the cross key 72a may be replaced with an operation section which includes a disc-shaped member horizontally slidable and outputs an operation signal in accordance with a sliding direction of the disc-shaped member. Still alternatively, the cross key 72a may be replaced with a touchpad.

Behind the cross key 72a on the top surface of the housing 71, a plurality of operation buttons 72b to 72g are provided. The operation buttons 72b to 72g are each an operation section for outputting an operation signal assigned thereto when the player presses a head thereof. For example, functions such as a No. 1 button, a No. 2 button, and an A button and the like are assigned to the operation buttons 72b to 72d. Further, functions such as a minus button, a home button, a plus button and the like are assigned to the operation buttons 72e to 72g. Various operation functions are assigned to these operation buttons 72a to 72g in accordance with the game program executed on the game apparatus body 5. In an exemplary arrangement shown in FIG. 3, the operation buttons 72b to 72d are arranged in a line at the center in a front-rear direction on the top surface of the housing 71. Further, the operation buttons 72e to 72g are arranged in a line on the top surface of the housing 71 in a left-right direction between the operation buttons 72b and 72d. The operation button 72f has a top surface thereof buried in the top surface of the housing 71 to reduce the possibility of inadvertent pressing by the player.

In front of the cross key 72a on the top surface of the housing 71, an operation button 72h is provided. The operation button 72h is a power switch for turning on and off the power to the game apparatus body 5 by remote control. The operation button 72h also has a top surface thereof buried in the top surface of the housing 71 to reduce the possibility of inadvertent pressing by the player.

Behind the operation button 72c on the top surface of the housing 71, a plurality of LEDs 702 is provided. A controller type (number) is assigned to the controller 7 so as to be distinguishable from another controller 7. For example, the LEDs 702 may be used to provide a player a visual indication of the controller type assigned to the controller 7. Specifically, a signal is transmitted, from the wireless controller module 19 to the controller 7, so as to light a LED corresponding to the above-described controller type among the plurality of LEDs 702.

On the top surface of the housing 71, speaker holes for emitting sound from a speaker (a speaker 706 shown in FIG. 5), which is to be described later, are formed between the operation button 72b and the operation buttons 72e to 72g.

On a bottom surface of the housing 71, a recessed portion is formed. The recessed portion on the bottom surface of the housing 71 is formed in a position in which an index finger or middle finger of the player is located when the player holds the controller with one hand and points a front portion thereof to the markers 8L and 8R. On a slope surface of the recessed portion, an operation button 72i is provided. The operation button 72i is an operation section acting as, for example, a B button.

On a front surface of the housing 71, an image pickup element 743 constituting a part of an imaging information calculation section 74 is provided. The imaging information calculation section 74 is a system which analyzes image data picked up by the controller 7, identifies a high brightness area in the image, and detects the center of gravity and a size or the like of the area. For example, the imaging information calculation section 74 has a maximum sampling period of about 200 frames/sec., and thus can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for coupling and connecting the controller with a connection cable.

For the sake of detailed explanation, a coordinate system set for the controller 7 will be defined. As shown in FIG. 3 and FIG. 4, an X-axis, a Y-axis, and a Z-axis which are perpendicular to one another are defined with respect to the controller 7. Specifically, a longitudinal direction, which is the front-rear direction, of the housing 71 is defined as the Z-axis, and a direction toward the front surface (a surface on which the imaging information calculation section 74 is provided) of the controller 7 is defined as a Z-axis positive direction. An up-down direction of the controller 7 is defined as the Y-axis, and a direction toward the top surface (a surface on which the operation button 72a is provided) of the housing 71 is defined as a Y-axis positive direction. Further, the left-right direction of the controller 7 is defined as the X-axis direction, and a direction toward the right side surface (a side surface shown in FIG. 3) of the housing 71 is defined as an X-axis positive direction.

Figure 5:
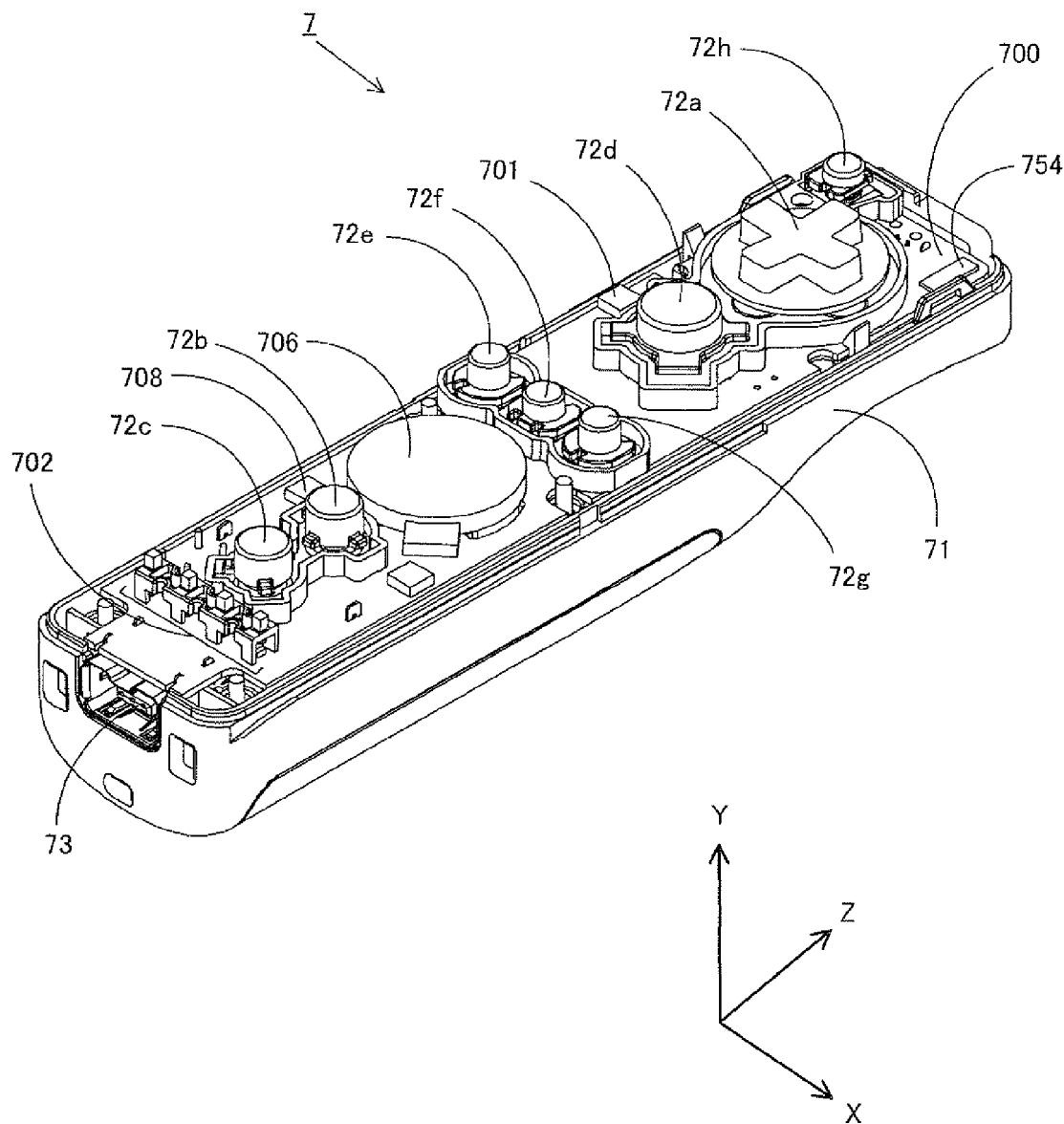
FIG. 5 is a perspective view of the controller 7 shown in FIG. 3 in a state where an upper housing thereof is removed.
Figure 6:
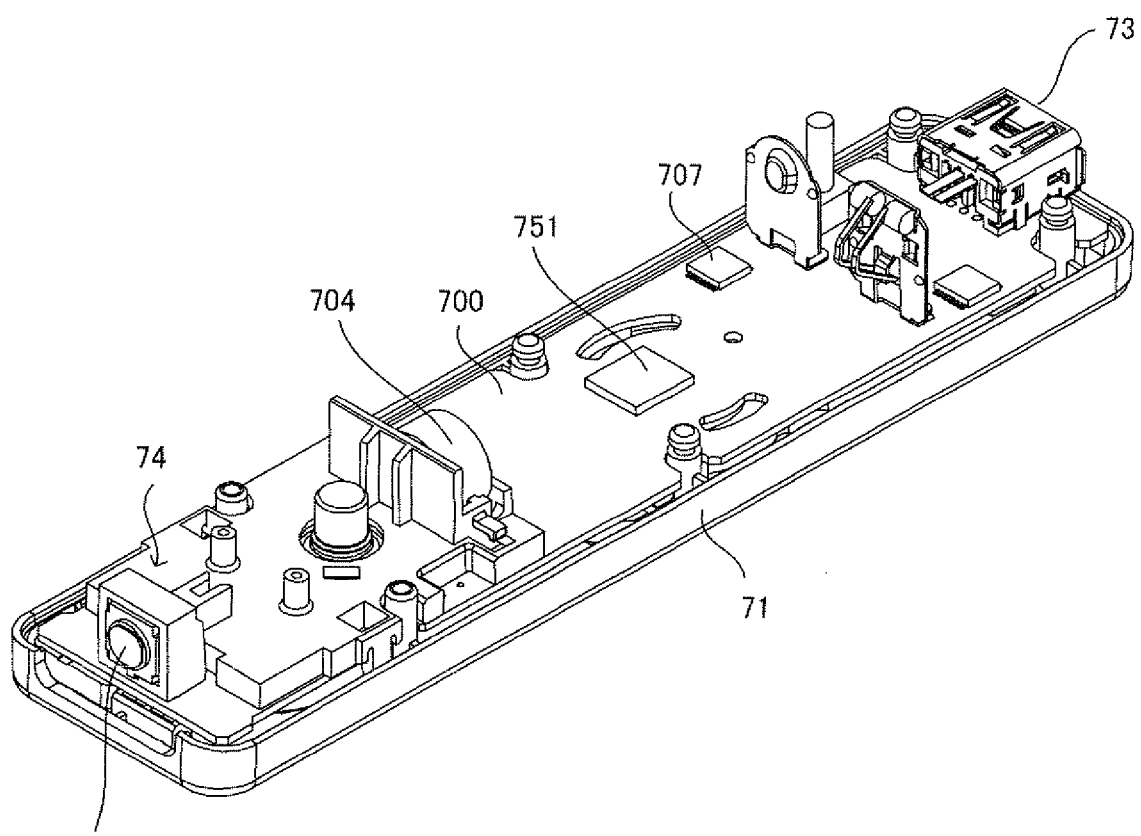
FIG. 6 is a perspective view of the controller 7 shown in FIG. 4 in a state where a lower housing thereof is removed.

Next, with reference to FIG. 5 and FIG. 6, an internal structure of the controller 7 will be described. FIG. 5 is a perspective view illustrating the controller 7, as viewed from the top rear surface thereof, in a state where an upper casing (a part of the housing 71) thereof is removed. FIG. 6 is a perspective view illustrating the controller 7, as viewed from the front side thereof, in a state where a lower casing (a part of the housing 71) thereof is removed. FIG. 6 shows a perspective view illustrating a reverse side of a substrate 700 shown in FIG. 5.

As shown in FIG. 5, the substrate 700 is fixed inside the housing 71. On a top main surface of the substrate 700, the operation buttons 72a to 72h, an acceleration sensor 701, the LEDs 702, an antenna 754, and the like are provided. These elements are connected to a microcomputer 751 (see FIGS. 6 and 7) and the like via lines (not shown) formed on the substrate 700 and the like. The wireless module 753 (see FIG. 7) and the antenna 754 allow the controller 7 to act as a wireless controller. A quartz oscillator (not shown) is provided inside the housing 71, and generates a reference clock of the microcomputer 751 to be described later. On a top main surface of the substrate 700, the speaker 706 and an amplifier 708 are provided. Further, the acceleration sensor 701 is provided on the substrate 700 to the left of the operation button 72d (that is, not at the center portion of the substrate 700 but near the periphery of the substrate 700). Accordingly, in addition to a directional change of gravity acceleration, the acceleration sensor 701 is capable of detecting acceleration including an acceleration component exerted by a centrifugal force in accordance with the controller 7 rotating about the longer direction thereof. Therefore, the game apparatus body 5 or the like is capable of determining, through a predetermined calculation, a motion of the controller 7 sufficiently accurately in accordance with the detected acceleration data.

As shown in FIG. 6, at a front edge of a bottom main surface of the substrate 700, the imaging information calculation section 74 is provided. The imaging information calculation section 74 includes an infrared filer 741, a lens 742, the image pickup element 743, and an image processing circuit 744, located in this order from the front surface of the controller 7 on the bottom surface of the substrate 700. To a rear edge of the bottom main surface of the substrate 700, the connector 73 is attached. Further, on the bottom main surface of the substrate 700, a sound IC 707 and the microcomputer 751 are provided. The sound IC 707, which is connected to the microcomputer 751 and the amplifier 708 via the line formed on the substrate 700 and the like, outputs an audio signal to the speaker 706 via the amplifier 708 in accordance with the sound data transmitted from the game apparatus body 5.

On the bottom main surface of the substrate 700, a vibrator 704 is attached. The vibrator 704 may be, for example, a vibration motor or a solenoid. The vibrator 704 is connected to the microcomputer 751 via the line formed on the substrate 700 and the like, and is powered on/off in accordance with vibration data transmitted from the game apparatus body 5. The controller 7 is vibrated by an actuation of the vibrator 704, and the vibration is conveyed to the player's hand holding the controller 7. Thus, a so-called vibration-responsive game may be realized. The vibrator 704 is provided near the front part of the housing 71, and therefore, a large vibration of the housing 71 allows the player holding the controller 7 to easily feel the vibration.

Next, with reference to FIG. 7, an internal configuration of the controller 7 will be described. FIG. 7 is a block diagram illustrating an exemplary configuration of the controller 7.

As shown in FIG. 7, the controller 7 includes the communication section 75, in addition to the operation section 72, the imaging information calculation section 74, the acceleration sensor 701, the vibrator 704, the speaker 706, the sound IC 707, and the amplifier 708 as described above.

The imaging information calculation section 74 includes the infrared filer 741, the lens 742, the image pickup element 743, and the image processing circuit 744. The infrared filer 741 allows only infrared light to pass therethrough, among light incident on the front surface of the controller 7. The lens 742 converges the infrared light having passed through the infrared filer 741 and outputs the infrared light to the image pickup element 743. The image pickup element 743 is a solid-state image pickup element such as a CMOS sensor or a CCD. The image pickup element 743 takes an image of the infrared light converged by the lens 742. Therefore, the image pickup element 743 takes an image of only the infrared light having passed through the infrared filer 741, and generates image data. The image data generated by the image pickup element 743 is processed by the image processing circuit 744. Specifically, the image processing circuit 744 processes the image data obtained from image pickup element 743, detects a high brightness area, and outputs process result data to the communication section 75, the process result data being indicative of a coordinate point and a size of the detected area. The imaging information calculation section 74 is fixed to the housing 71 of the controller 7, and thus an imaging direction thereof can be changed by changing the direction of the housing 71.

The controller 7 preferably includes a three-axis (X-axis, Y-axis, Z-axis) acceleration sensor 701. The three-axis acceleration sensor 701 detects a linear acceleration along three directions, i.e., the up-down direction (Y-axis shown in FIG. 3), the left-right direction (X-axis shown in FIG. 3), and the front-rear direction (Z-axis shown in FIG. 3). Further, an accelerometer capable of detecting linear acceleration along at least one axis direction (e.g., X-axis and Y-axis) may be used, alternatively. For example, the acceleration sensor 701 as described above may be of the type available from Analog Devices, Inc. or STMicroelectronics N.V. Preferably, the acceleration sensor 701 is an electrostatic capacitance (capacitance-coupling) type that is based on silicon micro-machined MEMS (Micro Electro Mechanical Systems) technology. However, any other suitable technology of accelerometer (for example, piezoelectric type or piezoresistance type) now existing or to be developed later may be used to provide the acceleration sensor 701.

An accelerometer used in the acceleration sensor 701 is capable of detecting acceleration (linear acceleration) only along a straight line corresponding to each axis of the acceleration sensor 701. In other words, directly output from the acceleration sensor 701 is a signal indicative of the linear acceleration (static or dynamic) along each of the three axes. As a result, the acceleration sensor 701 cannot directly detect movement along non-linear (e.g., arcute) path, rotation, rotational movement, angular displacement, tilt, position, posture, or any other physical characteristic.

However, when a computer, such as a processor (e.g., the CPU 10) of the game apparatus or a processor (e.g., the microcomputer 751) of the controller, processes acceleration signal outputted from the acceleration sensor 701, additional information relating to the controller 7 can be inferred or calculated (determined), as one skilled in the art will readily understand from the description herein.

For example, suppose a case where the computer processes the acceleration signal outputted from the acceleration sensor 701 of the controller 7 in a static state (that is, a case where it is anticipated that acceleration detected by the acceleration sensor 701 includes gravity acceleration only). In the case where the controller 7 is actually in a static state, it is possible to determine whether or not the controller 7 tilts relative to the direction of gravity and also to determine a degree of the tilt, based on the detected acceleration. Specifically, in the case of the acceleration sensor 701 which detects acceleration along a single axis direction, when a detected axis of the acceleration sensor 701 is directed to a vertically-downward direction, and such a situation is set as a reference, then it is possible to determine whether or not the controller 7 tilts relative to the vertically-downward direction, based on only whether or not 1G (gravity acceleration) is applied in the detected axis direction. Further, based on the magnitude of the acceleration applied in the detected axis direction, it is possible to determine a degree of the tilt of the controller 7 relative to the vertically-downward direction. Further, in the case of the acceleration sensor 701 which is capable of detecting the acceleration along multi-axis directions, an acceleration signal detected along each of the axes is processed, whereby it is possible to determine the tilt of the controller 7 relative to the direction of gravity. In this case, in accordance with an output from the acceleration sensor 701, data indicative of a tilt angle of the controller 7 may be calculated by the processor. Alternatively, without calculating the data indicative of the tilt angle, an approximate degree of the tilt of the controller 7 may be inferred based on the output from the acceleration sensor 701. In this manner, it is possible to determine the tilt, the posture, or the position of the controller 7 by using the acceleration sensor 701 and the processor in a combined manner.

On the other hand, in the case where the acceleration sensor 701 is in a dynamic state, the acceleration sensor 701 detects acceleration based on a movement of the acceleration sensor 701 in addition to the gravity acceleration component. Therefore, when the gravity acceleration component is eliminated through a predetermined process, it is possible to determine, for example, a direction in which the controller 7 moves. Specifically, when the controller 7 including the acceleration sensor 701 is dynamically accelerated and moved by a hand of a player, it is possible to calculate various motions and/or positions of the controller 7 by processing the acceleration signals generated by the acceleration sensor 701. Even in the case where the acceleration sensor 701 is in a dynamic state, it is possible to determine the tilt of the controller 7 relative to the direction of gravity provided that the acceleration based on the movement of the acceleration sensor 701 is eliminated through the predetermined process. As described later, even in a case where the acceleration sensor 701 is in a dynamic state, it is possible to determine the moving direction (swing direction) of the controller 7 without subtracting a gravity acceleration component or a translational acceleration component from the acceleration detected by the acceleration sensor 701.

In another embodiment, the acceleration sensor 701 may include an embedded signal processor or another type of dedicated processor for performing any desired process on the acceleration signal which is outputted from an embedded accelerometer before the signal is outputted to the microcomputer 751. For example, when the acceleration sensor 701 is designed to detect static acceleration (for example, the gravity acceleration), the embedded signal processor or the dedicated processor may convert the detected acceleration signal into a corresponding tilt angle (or another preferable parameter). Data indicative of the acceleration detected by the acceleration sensor 701 is outputted to the communication section 75.

The communication section 75 includes the microcomputer 751, a memory 752, the wireless module 753, and the antenna 754. At the time of processing, the microcomputer 751 controls the wireless module 753 for wirelessly transmitting transmission data while using the memory 752 as a storage area. Further, the microcomputer 751 controls operations of the sound IC 707 and the vibrator 704 in accordance with the data received by the wireless module 753 from the game apparatus body 5 via the antenna 754. The sound IC 707 processes the sound data and the like transmitted from the game apparatus body 5 via the communication section 75. Further, the microcomputer 751 actuates the vibrator 704 in accordance with vibration data (e.g., a signal for turning the vibrator 704 "ON" or "OFF") transmitted from the game apparatus body 5 via the communication section 75.

Data from the controller 7 such as an operation signal (key data) from the operation section 72, an acceleration signal in the three axis directions (X-axis, Y-axis, and Z-axis direction acceleration data) from the acceleration sensor 701, and process result data from the imaging information calculation section 74 are outputted to the microcomputer 751. The microcomputer 751 temporarily stores the inputted data (the key data, the X-axis, Y-axis, and Z-axis direction acceleration data, and the process result data) in the memory 752 as transmission data to be transmitted to the wireless controller module 19. The wireless transmission from the communication section 75 to the wireless controller module 19 is performed in predetermined time cycles. Since the game process is generally performed in a cycle of $1/60$ sec., the wireless transmission needs to be performed in a cycle of a shorter time period. Specifically, the game process is performed in a cycle of 16.7 ms ($1/60$ sec.), and a transmission cycle of the communication section 75 including the Bluetooth (registered trademark) is 5 ms. At a timing of performing a transmission to the wireless controller module 19, the microcomputer 751 outputs, to the wireless module 753, the transmission data stored in the memory 752 as a series of pieces of operation information. The wireless module 753 then uses the Bluetooth (registered trademark) technology, for example, so as to emit a radio signal indicative of the operation information from the antenna 754 by using a carrier wave having a predetermined frequency. In other words, data including the key data from the operation section 72, the X-axis, Y-axis and Z-axis direction acceleration data from the acceleration sensor 701, and the process result data from the imaging information calculation section 74, is transmitted from the controller 7. The wireless controller module 19 of the game apparatus body 5 receives the radio signal, and the radio signal is demodulated or decoded in the game apparatus body 5, whereby a series of pieces of operation information (such as the key data, the X-axis, Y-axis, and Z-axis direction acceleration data, and the process result data) is obtained. The CPU 10 included in the game apparatus body 5 performs the game process based on the obtained operation information and on the game program. In the case where the communication section 75 is configured by using the Bluetooth (registered trademark) technology, the communication section 75 may have a function of receiving transmission data wirelessly transmitted from another device.

Figure 11:
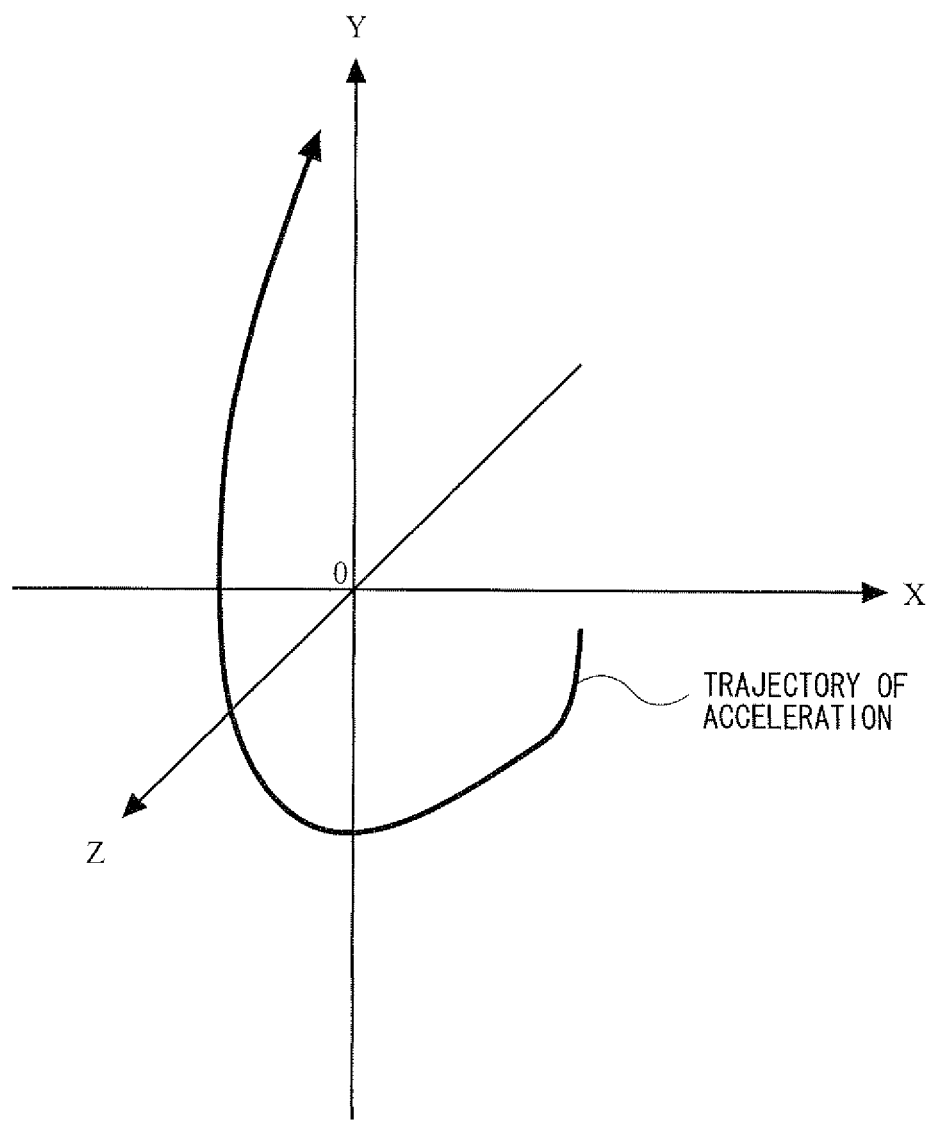
FIG. 11 is a diagram showing an example of a trajectory of acceleration generated when a player swings the controller 7 upwardly.
Figure 12:
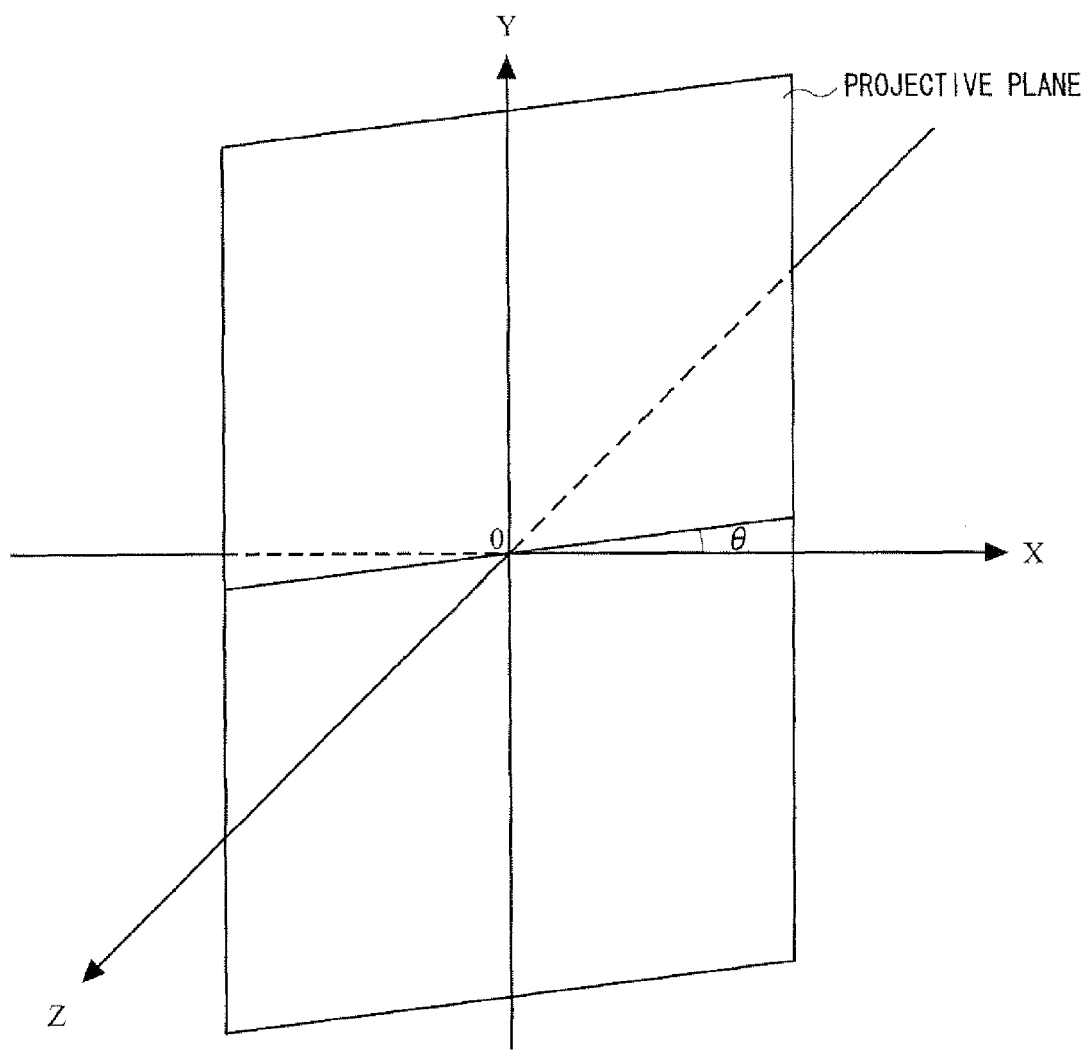
FIG. 12 is a diagram showing an example of a projective plane onto which X-axis and Z-axis components of the acceleration vector shown in FIG. 11 are projected.
Figure 13:
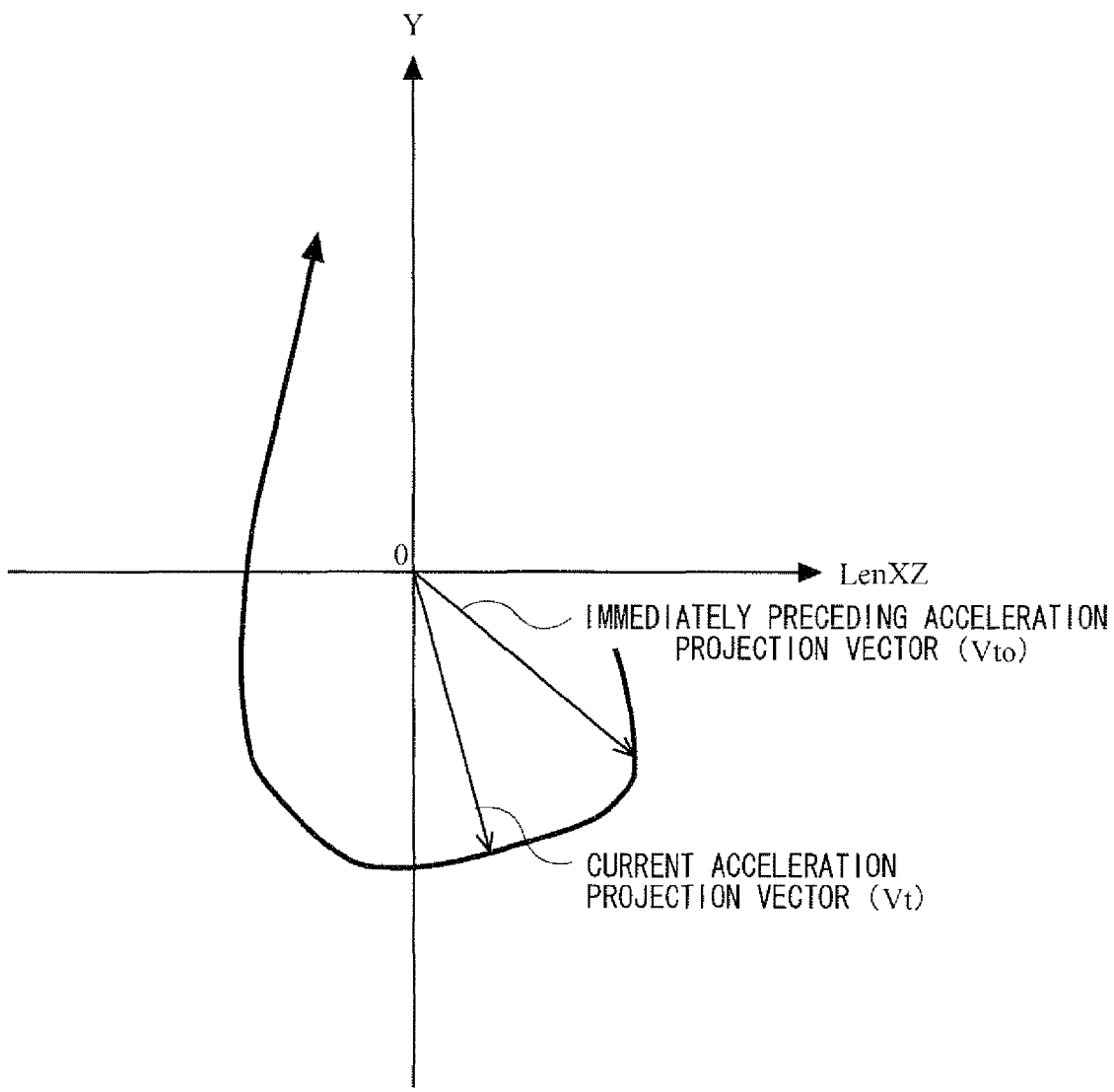
FIG. 13 is a diagram showing an example of an acceleration projection vector calculated when the player swings the controller 7 shown in FIG. 8 upwardly.

Next, with reference to FIGS. 8 to 13, an outline of a game performed on the game apparatus body 5 will be described prior to describing specific processes performed on the game apparatus body 5. FIG. 8 is a diagram illustrating an example of a state where a player performs a game operation using the controller 7. FIG. 9 is a diagram showing an example of a game image displayed on a monitor 2. FIG. 10 is a diagram showing another example of the game image displayed on a monitor 2. FIG. 11 is a diagram showing an example of a trajectory of acceleration generated when a player swing the controller 7 upwardly. FIG. 12 is a diagram showing an example of a projective plane onto which X-axis and Y-axis components of the acceleration vector are projected. FIG. 13 is a diagram showing an example of an acceleration projection vector calculated when the player swings the controller 7 upwardly. In the following description, an example will be described where a player plays a golf game in a virtual game world displayed on the monitor 2, while holding the controller 7 as if holding a golf club.

As shown in FIG. 8, the controller 7 has an overall size capable of being held by one hand of an adult or even a child. When playing a game on the game system 1 with the use of the controller 7, a player holds the controller 7 with his/her both hands such that the front surface of the controller 7 faces a forward direction from the player. For example, the player places his/her right hand palm on a right side surface of the controller 7 (housing 71), places his/her left hand palm on a left side surface of the controller (housing 71), and holds the controller 7 while causing the front surface of the controller 7 to face the forward direction from the player as if the player holds a golf club. In exemplary processing described later, a case as shown in FIG. 8 will be described where a player holds and operates the controller 7 such that the upper surface of the controller 7 face the forward direction from the player when the player takes an attitude while causing the front surface of the controller 7 to face a downward direction (i.e., an address position in a golf swing). Hereinafter described is a case where the player is right-handed.

When the player swings the controller 7 in various directions, various pieces of operation information are provided to the game apparatus body 5 from the controller 7. For example, when the player swings the controller 7 upwardly, or swings the controller 7 downwardly to the address position, before performing a swing for hitting a ball in a golf game, operation information corresponding to the upward swinging operation and the downward swinging operation (specifically, X-axis, Y-axis, and Z-axis direction acceleration data) is provided to the game apparatus body 5 from the controller 7. In accordance with the X-axis, Y-axis, and Z-axis direction acceleration data received from the controller 7, a game image will be presented on the monitor 2 in which a player character displayed therein swings a golf club upwardly and downwardly.

As shown in FIG. 9 and FIG. 10, the player character PC holds a golf club C, and is located in a virtual game world. In accordance with a motion of the player swinging the controller 7, animation is displayed in which the player character PC swings the golf club C. When the player swings the controller 7 as if the player hits a golf ball, the animation shows a scene where a ball object BO located in the virtual game world is hit with the golf club C. For example, as shown in FIG. 9, when the player swings the controller 7 upwardly from the address position, the player character PC in the virtual game world displayed on the monitor 2 swings the golf club C upwardly in accordance with the X-axis, Y-axis, and Z-axis direction acceleration data received from the controller 7. On the other hand, when the player swings the controller 7 downwardly to the address position, the player character PC swings the golf club C downwardly to the address position in accordance with the X-axis, Y-axis, and Z-axis direction acceleration data received from the controller 7. Hereinafter, processing of determining (i.e., determination of a swing direction) whether the controller 7 is swung upwardly or downwardly will be described.

For example, when, as shown in FIG. 8, when the player swings the controller 7 upwardly toward the right upper side from the address position (back swing), acceleration as shown in FIG. 11 is generated. In FIG. 11, acceleration components indicated by the X-axis direction acceleration data, the Y-axis direction acceleration data, and the Z-axis direction acceleration data, which are received from the controller 7, are represented by X-axis direction acceleration AccX, Y-axis direction acceleration AccY, and Z-axis direction acceleration AccZ, respectively. FIG. 11 is a graph in which acceleration components generated during upward swinging operation are plotted on a coordinate system defined by three axes (X-axis, Y-axis, and Z-axis), which are perpendicular to one another, in time-sequential order. When the X-axis direction acceleration AccX, the Y-axis direction acceleration AccY, and the Z-axis direction acceleration AccZ, which are generated at a certain point of time, are represented as acceleration vector (AccX, AccY, AccZ), the plotting in time-sequential order may be considered as a trajectory of acceleration indicating transition of an end point of the acceleration vector (AccX, AccY, AccZ) (i.e., transition of X, Y, and Z components of the acceleration vector) during the upward swing operation.

As shown in FIG. 11, the acceleration generated during the upward swing operation is represented as a trajectory of a circle shape drawn in a space of the XYZ-axis coordinate system. In addition, as shown in FIG. 8, when the player swings the controller 7 downwardly to the address position from the right upper side, the acceleration generated during the downward swing operation is also represented as a trajectory of a circle shape drawn in the space of the XYZ-axis coordinate system. The direction in which the circle is drawn by the trajectory of the acceleration generated during the downward swing operation is opposite to the direction in which the circle is drawn by the trajectory of the acceleration generated during the upward swing operation. For example, when the trajectory of the acceleration is viewed from the Z-axis positive side, the trajectory is drawn in a clockwise direction during the upward swing operation, whereas the trajectory is drawn in an anti-clockwise direction during the downward swing operation.

The circle shape drawn in the space of the XYZ-axis coordinate system cannot be a circle depending on a direction along which the circle shape is viewed, that is, there is a case where the circle shape is viewed as a linear shape. Specifically, when the circle shape is viewed from a direction parallel to a plane including the circle shape, at least a part of the circle shape is viewed as a linear shape. On the other hand, when the circle shape is viewed from a direction perpendicular to a plane including the circle shape, the circle shape is viewed as it is. In the present embodiment, when the shape of the trajectory of the acceleration is the circle shape, the trajectory of the acceleration is projected onto a predetermined projective plane in order to identify a swing direction by using the circle shape.

When the controller 7 is swung and moved on a certain plane by a player, a rotation axis of the swing motion is perpendicular to the plane. The acceleration generated by the swing motion is applied along the direction of the plane, and not applied in the direction of the rotation axis. Thus, the acceleration generated by the swing motion draws a trajectory along the above-described plane in the space of the XYZ-axis coordinate system. For example, when the player swings the controller 7 horizontally (i.e., the controller 7 being swung horizontally along the X-axis direction) while the upper surface of the controller 7 faces an upper side, the acceleration generated by the horizontal swing motion is applied in a direction along an XZ-axis plane, but is not applied in the Y-axis direction (i.e., the direction along the rotation axis). The acceleration generated by the above horizontal swing motion draws a trajectory of a circle shape along a plane parallel to the XZ-axis plane in the space of the XYZ-axis coordinate system. Theoretically, when the acceleration is projected to a predetermined plane in a space of the XYZ-axis coordinate system, in order to draw a trajectory of acceleration of a substantially circle shape, it is preferable to set a projective plane substantially parallel to the predetermined plane. That is, the projective plane is set to be substantially perpendicular to the rotation axis about which the controller 7 is swung. However, the arrangement of the projective plane is not limited to this. When the acceleration projected onto a predetermined plane in the space of the XYZ-axis coordinate system draws a trajectory of a substantially circle shape, the projective plane is set so as to be substantially non-perpendicular to the predetermined plane, i.e., not to be substantially parallel to the rotation axis about which the controller 7 is swung. Accordingly, it is possible to distinguish the direction in which the trajectory is drawn. Therefore, the projective plane may be arranged in any manner, as long as the projective plane is not substantially perpendicular to the predetermined plane (e.g., a plane including the circle shape), i.e., not substantially parallel to the rotation axis about which the controller 7 is swung.

For example, as shown in FIG. 12, the present embodiment uses a projective plane which is parallel to the Y-axis and which is angled θ degrees with respect to the X-axis. Specifically, in the present embodiment, supposing a case of a golf swing operation with the use of the controller 7, the projective plane is set to be angled θ=12°, and a value LenXZ which is obtained by projecting the X-axis direction acceleration AccX and the Z-axis direction acceleration AccZ on the projective plane is used. When the value LenXZ which is obtained during the upward swing operation and the Y-axis direction acceleration AccY are represented with acceleration projection vector (LenXZ, AccY, 0), the trajectory indicating the transition of the endpoint of the acceleration projection vector (LenXZ, AccY, 0) (i.e., transition of the X, Y, and Z components of the acceleration projection vector) is of a circle shape drawn in the clockwise direction as shown in FIG. 13.

In the case where the trajectory of the endpoint of the acceleration projection vector draws a circle shape, in order to identify the direction in which the circle is drawn, a cross product between the acceleration projection vector and an acceleration projection vector obtained in the past may be used. For example, as shown in FIG. 13, when an acceleration projection vector calculated in an immediately preceding process is Vto, and an acceleration projection vector calculated in a current process is Vt, then it is possible to identify the direction in which the circle is drawn by using a direction of the cross product between the acceleration projection vector Vto and the acceleration projection vector Vt. Specifically, whether the direction of the cross product between the acceleration projection vector Vto and the acceleration projection vector Vt is a predetermined direction or a direction reverse thereof is distinguished, and thereby it is possible to identify the direction in which the circle is drawn (i.e., the direction in which the controller 7 is swung). As a preferable method for identifying the direction of the cross product, considered is a method of using a cross product value which indicates a component in a predetermined direction of the cross product between the acceleration projection vector Vto and the acceleration projection vector Vt. For example, in an example shown in FIG. 13, when whether the Z-axis component (cross product value) of the cross product between the acceleration projection vector Vto and the acceleration projection vector Vt is positive or negative is identified, it is possible to identify the direction in which the circle is drawn. Specifically, when the cross product value is negative, it is possible to identify that the trajectory of the endpoint of the acceleration projection vector is drawn in a circle shape in the clockwise direction, and thus it is possible to determine that the controller 7 is swung up from the address position toward the right upper side. On the other hand, when the cross product value is positive, it is identified that the trajectory of the endpoint of the acceleration projection vector is drawn in a circle shape in the anti-clockwise direction, and thus it is possible to determine that the controller 7 is swung down from the right upper side toward the address position.

Figure 14:
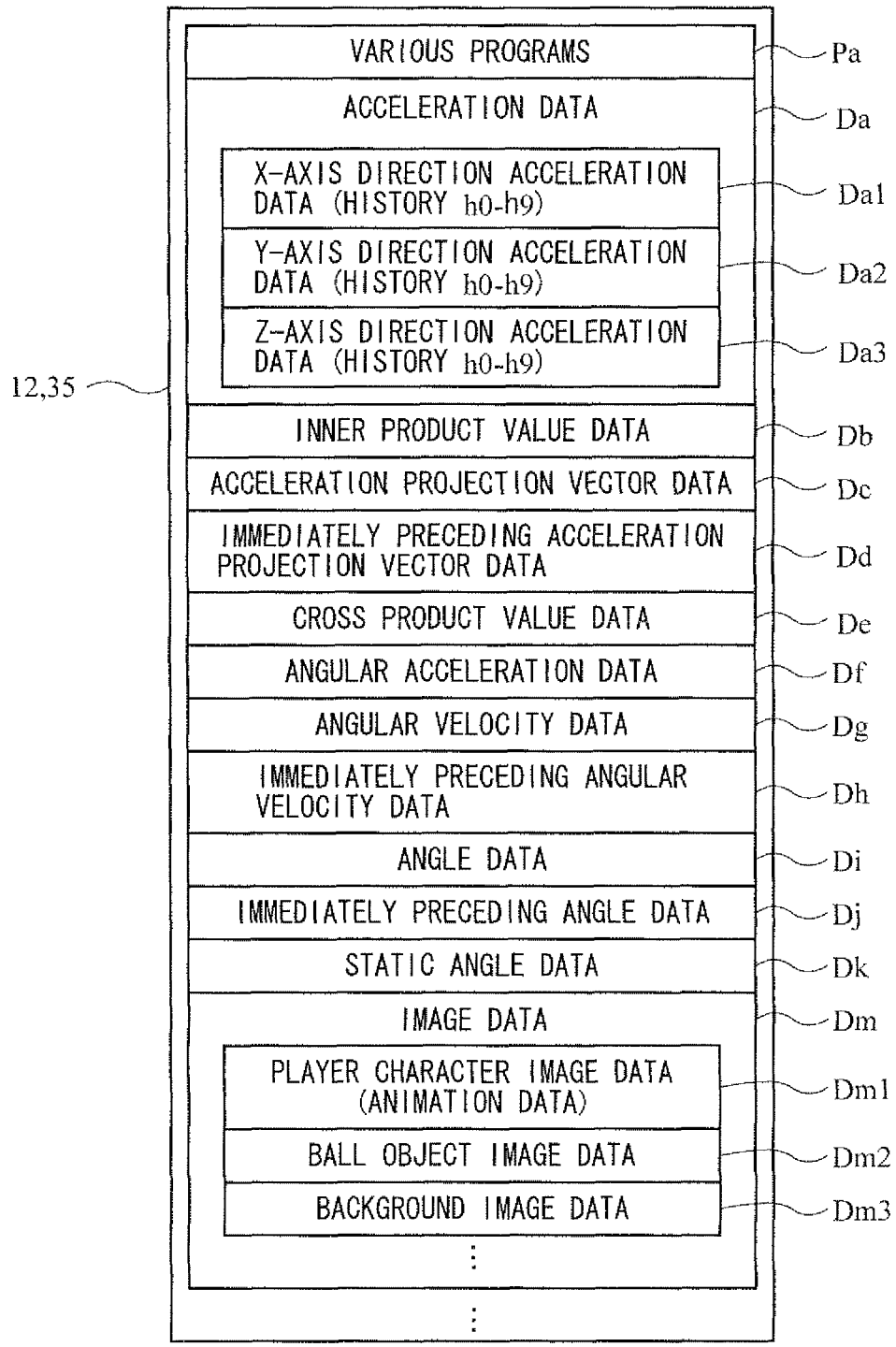
FIG. 14 shows examples of main data and programs stored in a main memory of the game apparatus body 5 shown in FIG. 1.

Next, the game process performed on the game system 1 will be described in detail. With reference to FIG. 14, major data used in the game process will be described. FIG. 14 is a diagram showing major data and programs stored in the external main memory 12 and/or the internal main memory 35 (hereinafter collectively referred to as main memory) of the game apparatus body 5.

As shown in FIG. 14, data storage area of the main memory has stored therein acceleration data Da, inner product value data Db, acceleration projection vector data Dc, immediately preceding acceleration projection vector data Dd, cross product value data De, angular acceleration data Df, angular velocity data Dg, immediately preceding angular velocity data Dh, angle data Di, immediately preceding angle data Dj, static angle data Dk, image data Dm, and the like. The main memory stores therein data necessary for a game process such as data (e.g., position data) relating to other objects than the player character PC appearing on the game, in addition to such data included in information shown in FIG. 14. Further, a program storage area of the main memory stores therein various programs Pa which configure the game program.

The acceleration data Da is data representing acceleration applied to the controller 7, and has stored therein a history of a most recent acceleration data included in the series of pieces of operation information transmitted from the controller 7 as the transmission data. The acceleration data Da includes: X-axis direction acceleration data Da1 which indicates histories h0 to h9 of the X-axis component of the acceleration (i.e., history of the acceleration along the X-axis direction in past 10 times) detected by the acceleration sensor 701; Y-axis direction acceleration data Dat which indicates histories h0 to h9 of the detected Y-axis component of the acceleration (i.e., history of acceleration along the Y-axis direction in the past 10 times); and Z-axis direction acceleration data Da3 which indicates histories h0 to h9 of the detected Z-axis component of the acceleration (i.e., history of the acceleration along the Z-axis direction in the past 10 times). The wireless controller module 19 provided to the game apparatus body 5 receives the acceleration data included in the operation information which is transmitted from the controller 7 in predetermined time cycles (e.g., 1/200 sec.), and stores the acceleration data in a buffer (not shown) of the wireless controller module 19. Thereafter, the acceleration data stored in the buffer is read every frame period (e.g., 1/60 sec.), which corresponds to a game process cycle, and the acceleration data Da in the main memory is updated.

Since a cycle of receiving the operation information is different from the data process cycle, plurality pieces of the operation information received through a plurality of cycles is described in the buffer. In the processing to be described later, only a latest piece of operation information, among the plurality of pieces of operation information, is used for processing, and the processing is advanced to subsequent steps successively.

In a process flow to be described later, an exemplary case will be used where the acceleration data Da is updated every frame period, namely, every game process cycle, respectively. However, the acceleration data Da may be updated in other process cycles. For example, the acceleration data Da is updated in every transmission cycle from the controller 7, and the updated acceleration data Da may be used in every game process cycle. In this case, the cycle of updating the acceleration data Da1 to Da3 to be stored in the acceleration data Da is different from the game process cycle.

The inner product value data Db stores therein data indicative of the value LenXZ, which is obtained, when the X-axis direction acceleration AccX and the Z-axis direction acceleration AccZ are projected on a projective plane, from an inner product therebetween. The acceleration projection vector data Dc stores therein data indicative of an acceleration projection vector (LenXZ, AccY, 0) which is obtained from the value LenXZ and the Y-axis direction acceleration AccY. The immediately preceding acceleration projection vector data Dd stores therein data indicative of an acceleration projection vector obtained from immediately preceding processing. The cross product value data De stores therein data indicative of a Z-axis component (cross product value) which is obtained from a cross product between the acceleration projection vector obtained in the immediately preceding processing and an acceleration projection vector obtained in current processing.

The angular acceleration data Df stores therein data indicative of angular acceleration of a golf club C swung by a player character PC. The angular velocity data Dg stores therein data indicative of an angular velocity of the golf club C swung by the player character PC. The immediately preceding angular velocity data Dh stores therein data indicative of an angular velocity of the golf club C, the velocity having been obtained in the immediately preceding processing. The angle data Di stores therein dada indicative of an angle of the golf club C swung by the player character PC. The immediately preceding angle data Dj stores therein data indicative of the angle of the golf club C, the angle having been obtained in the immediately preceding processing. The static angle data Dk stores therein data indicative of an attitude (angle) of the controller 7 calculated when the controller 7 is in a static state.

The image data Dm includes player character image data Dm1, ball object image data Dm2, background image data Dm3, and the like. The player character image data Dm1 is data for generating a game image by arranging a player character PC in a virtual game world, and for example, stores therein animation data corresponding to various conditions of the player character PC performing a golf swing. The ball object image data Dm2 is data for generating a game image by arranging a ball object BO in the virtual game world. The background image data Dm3 is data for generating a game image by arranging a background in the virtual game world.

Figure 15:
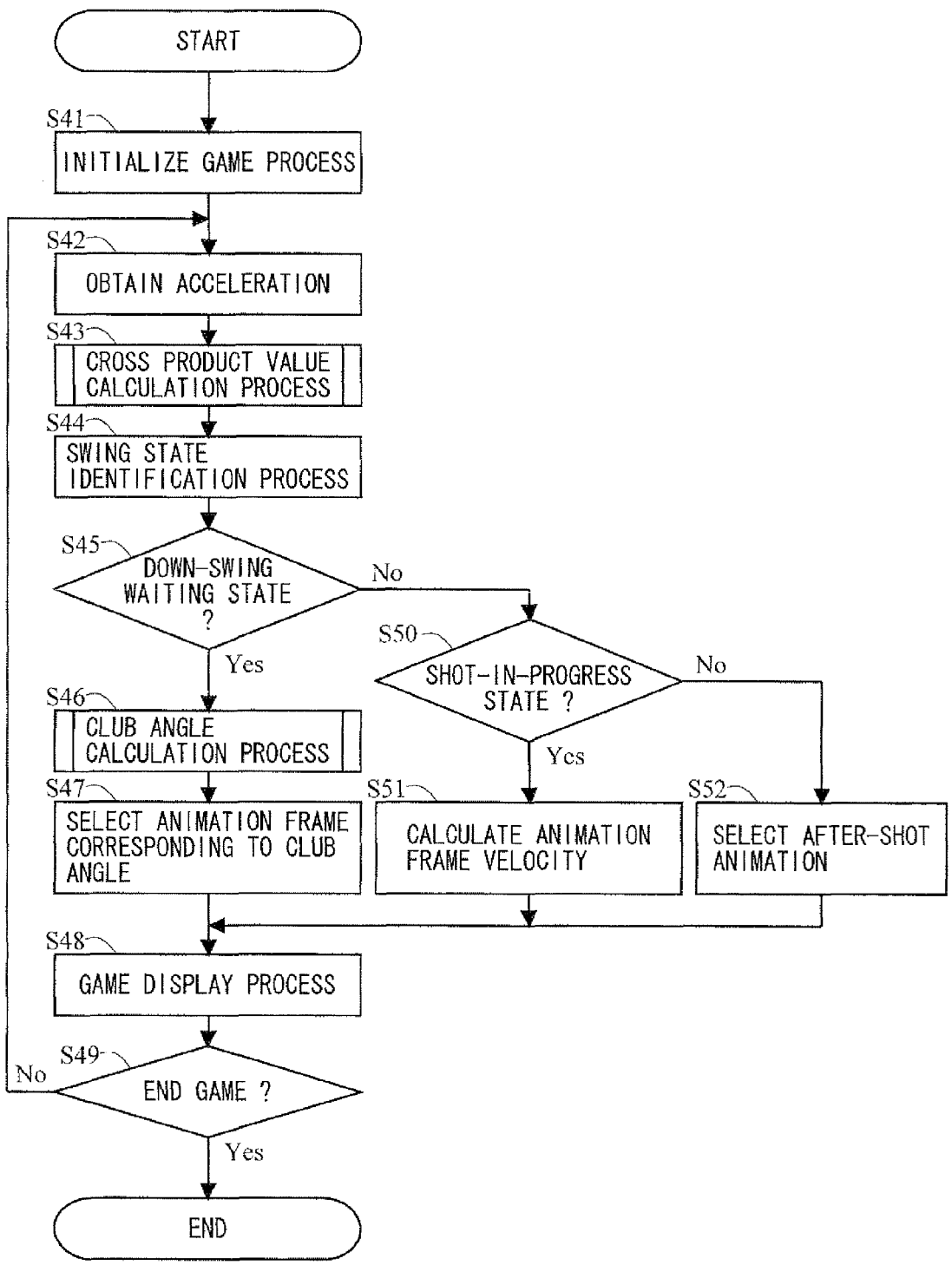
FIG. 15 is a flowchart showing an example of a game process executed on the game apparatus body 5 shown in FIG. 1.
Figure 17:
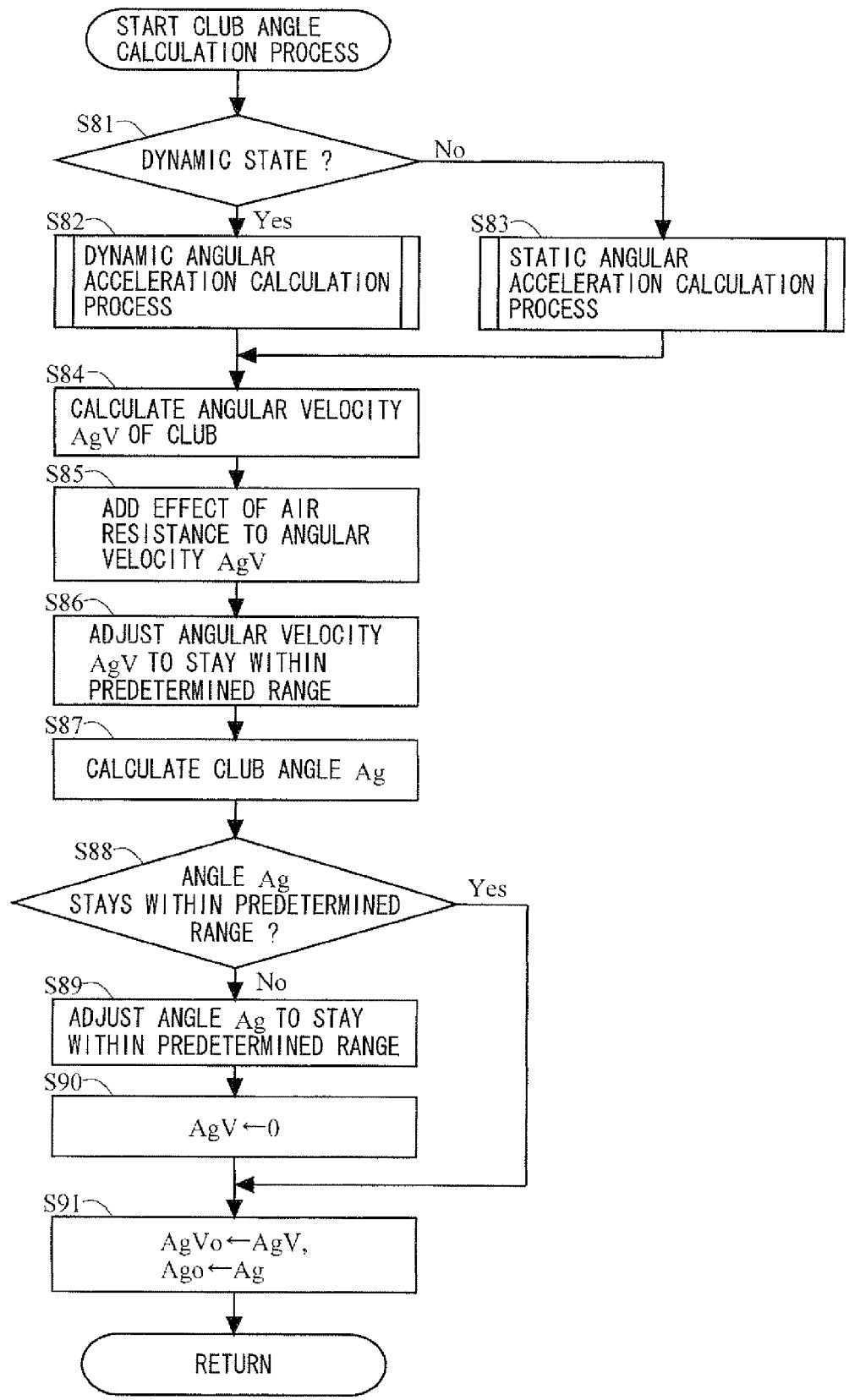
FIG. 17 is a subroutine showing an example of a club angle calculation process in step 46 shown in FIG. 15.
Figure 18:
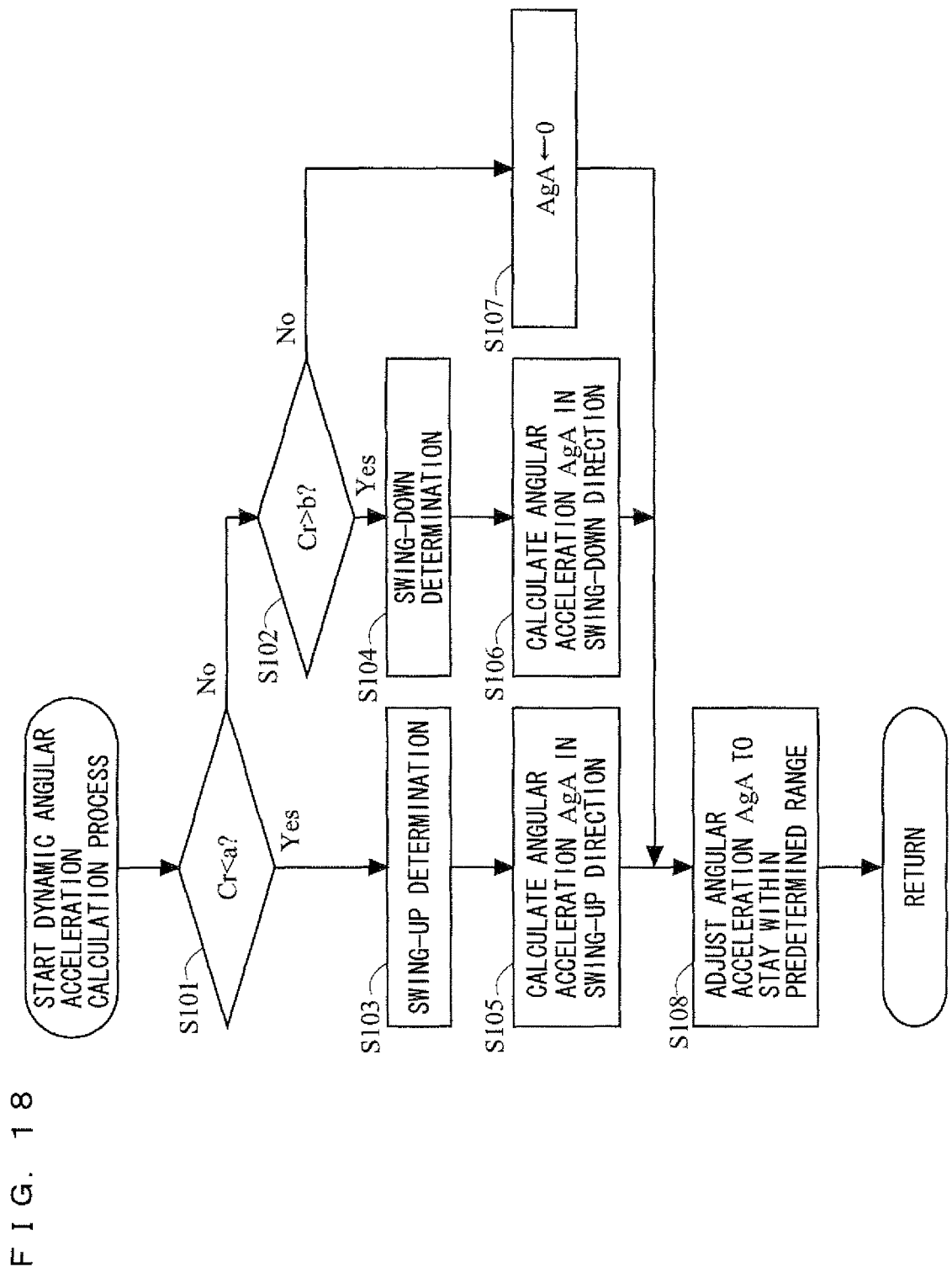
FIG. 18 is a subroutine showing an example of a dynamic angular acceleration calculation process in step 82 shown in FIG. 17.
Figure 19:
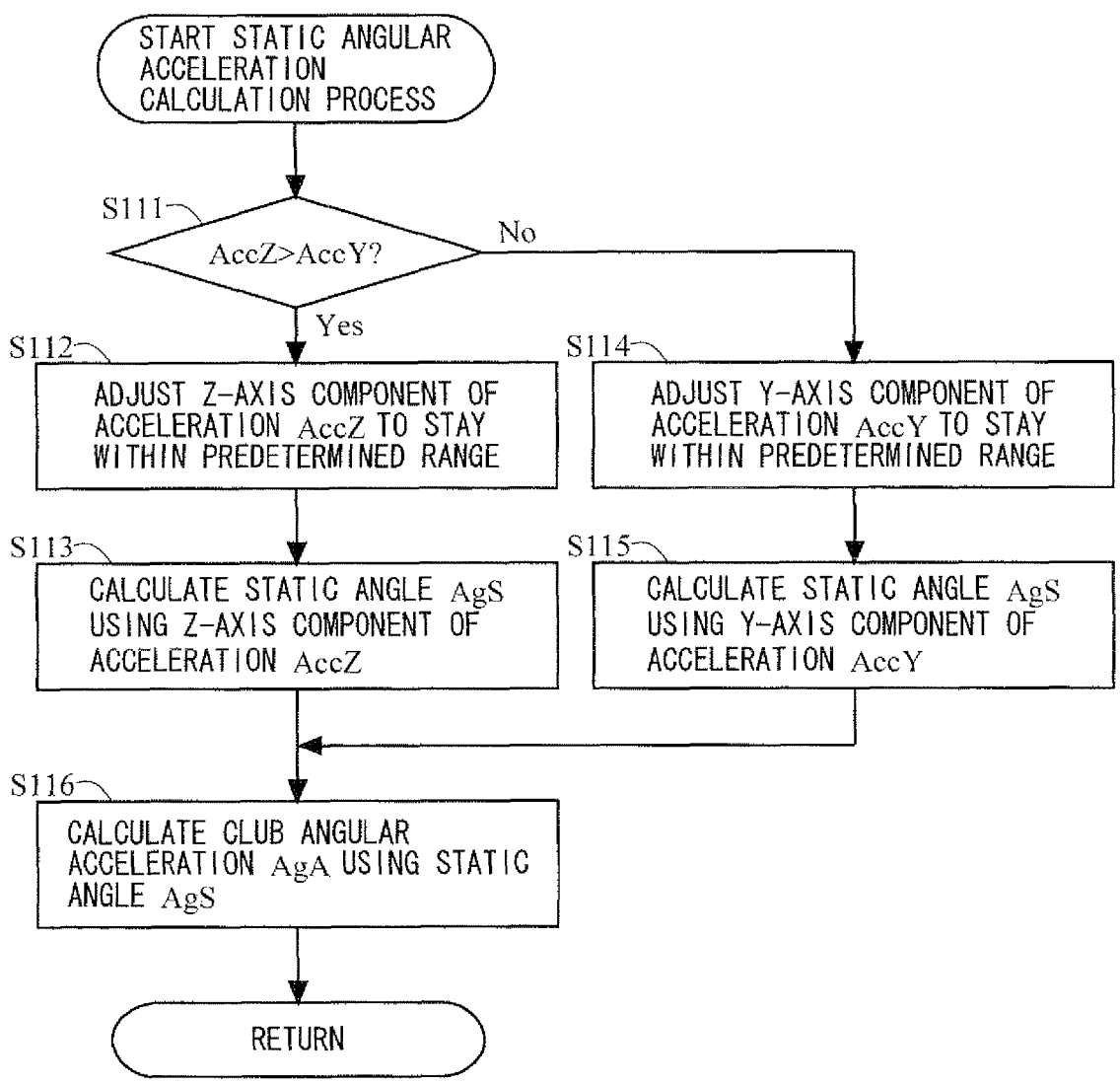
FIG. 19 is a subroutine showing an example of a static angular acceleration calculation process in step 83 shown in FIG. 17.

Next, with reference to FIG. 15 to FIG. 19, a game process performed on the game apparatus body 5 will be described in detail. FIG. 15 is a flowchart showing an example of the game process executed on the game apparatus body 5. FIG. 16 is a subroutine showing an example of a cross product value calculation process in step 43 shown in FIG. 15. FIG. 17 is a subroutine showing an example of a club angle calculation process in step 46 shown in FIG. 15. FIG. 18 is a subroutine showing an example of a dynamic angular acceleration calculation process in step 82 shown in FIG. 17. FIG. 19 is a subroutine showing an example of a static angular acceleration calculation process in step 83 shown in FIG. 17. In flowcharts shown in FIGS. 15 to 19, a game process will be described by using a golf game as an example. Further, in the flowcharts shown in FIG. 15 to FIG. 19, in the game process, a process of swinging performed by the player character PC in response to a swinging of the controller 7 by a player will be mainly described. Detailed description of the game process that is not directly related to the present invention will be omitted. Still further, in FIG. 15 to FIG. 19, respective steps executed by the CPU 10 is abbreviated as "S".

When the game apparatus body 5 is powered on, the CPU 10 of the game apparatus body 5 executes a boot-up program stored in the ROM/RTC 13, thereby initializing respective units such as the main memory. A game program stored in the optical disc 4 is loaded into the main memory, and the CPU 10 starts executing the game program. The flowchart shown in each of FIG. 15 to FIG. 19 shows a game process to be performed after completion of the above-described process.

In FIG. 15, the CPU 10 initializes the game process (step 41), and advances the processing to a subsequent step. For example, in the initialization of the game process, setting of the virtual game world, initialization of the player character PC or the like are performed. Further, in the initialization of the game process in step 41, respective parameters to be used in the game process performed thereafter are also initialized. For example, the CPU 10 sets respective parameters indicated by respective pieces of data Da to Dk, which are stored in the main memory, to initial values, respectively. Further, in the initialization of the game process in step 41, setting is performed in relation to a dominant hand of a player grasping the controller 7 for playing, that is, whether swinging of the controller 7 for a golf play is performed right-handed or left-handed. For setting of hand dominance, the dominant hand may be selected by a player in advance, and the setting may be performed based on the selected dominant hand.

Next, the CPU 10 obtains acceleration data indicative of acceleration from the controller 7 (step 42), and advances the processing to a subsequent step. For example, the CPU 10 obtains the operation information received from the controller 7, and stores, in the acceleration data Da, acceleration indicated by most recent acceleration data included in the operation information. Specifically, the CPU 10 updates histories h0 to h9 of acceleration stored in the acceleration data Da by shifting the respective histories forward for replacement in time-sequential order. That is, the CPU 10 deletes the history h9 of the acceleration, and shifts the history h8 forward so as to replace the history h9 therewith, the history h7 forward to replace the history h8 therewith, the history h6 forward to replace the history h7 therewith, the history h5 forward to replace the history h6 therewith, the history h4 forward to replace the history h5 therewith, the history h3 forward to replace the history h4 therewith, the history h2 forward to replace the history h3 therewith, the history h1 forward to replace the history h2 therewith, and the history h0 forward to replace the history h1 therewith, thereby updating the histories. By using the acceleration AccX indicated by the X-axis direction acceleration data included in the most recent operation information received from the controller 7, the CPU 10 updates the history h0 of the X-axis direction acceleration data Da1. Further, by using acceleration AccY indicated by the Y-axis direction acceleration data included in the most recent operation information, the CPU 10 updates the history h0 of the Y-axis direction acceleration data Dat. By using acceleration AccZ indicated by the Z-axis direction acceleration data included in the most recent operation information, the CPU 10 updates the history h0 of the Z-axis direction acceleration data Da3.

Next, the CPU 10 performs a cross product value calculation process, and advances the processing to step 44 subsequently. Hereinafter, with reference to FIG. 16, a detailed operation in the cross product value calculation process performed in step 44 will be described.

In FIG. 16, by projecting the most recent X-axis direction acceleration AccX and the most recent Z-axis direction acceleration AccZ onto a predetermined projective plane, the CPU 10 calculates a value LenXZ (step 61), and advances the processing to a subsequent step. For example, as described with reference to FIG. 12, in the present embodiment, in order to identify the shape (circle shape) of the trajectory of acceleration, the trajectory of acceleration is projected onto a predetermined projective plane. For example, a projective plane used in above step 61 is parallel to the Y-axis, and is angled θ (e.g., 12°) with respect to the X-axis. The most recent X-axis direction acceleration AccX and the most recent Z-axis direction acceleration AccZ are projected onto the projective plane, whereby the value LenXZ is obtained.

For example, in order to obtain a value projected onto the above projective plane, an inner product is used. Specifically, a vector indicative of X-axis and Z-axis components of acceleration (acceleration AccX indicated by the history h0 of the X-axis direction acceleration data Da1 and acceleration AccZ indicated by the history h0 of the Z-axis direction acceleration data Da3) obtained in above step is set as AccXZ (AccX, 0, AccZ). In addition, a unit vector (a vector having magnitude 1) that indicates a direction of the projective plane disposed so as to be parallel to the Y-axis and to be angled 12° with respect to the X-axis is set as PD (0.98, 0, −0.21). In this case, the value LenXZ is represented as follows.

$$LenXZ = AccXZ \cdot PD$$

That is, the value is calculated by the inner product between the vector AccXZ, and the vector PD. The CPU 10 then updates the inner product value data Db by using the calculated value LenXZ.

Next, the CPU 10 calculates the acceleration projection vector Vt (step 62), and advances the processing to a subsequent step. For example, by using the acceleration AccY indicated by the history h0 of the Y-axis direction acceleration data Da2 and the value LenXZ indicated by the inner product value data Db, the CPU 10 calculates the acceleration projection vector Vt (LenXZ, AccY, 0), and updates the acceleration projection vector data De by using the calculated acceleration projection vector Vt.

Next, the CPU 10 calculates a cross product CV between the acceleration projection vector Vto obtained in the immediately preceding process, and the acceleration projection vector Vt calculated in above step 62 (step 63). The CPU 10 sets a Z-axis component of the cross product CV obtained in step 63 as a cross product value Cr (step 64), and advances the processing to a subsequent step. For example, the CPU 10 uses the immediately preceding acceleration projection vector Vto (LenXZo, AccYo, 0) indicated by the immediately preceding acceleration projection vector data Cd, and the acceleration projection vector Vt (LenXZ, AccY, 0) indicated by the acceleration projection vector data De, so as to calculate the cross product CV as follows.

$$CV = Vto \times Vt = (0, 0, LenXZo*LenXZ - AccYo*AccY)$$

That is, the cross product CV is calculated as the cross product between the acceleration projection vector Vto and the acceleration projection vector Vt. The CPU 10 sets the Z-axis component of the calculated cross product CV as a cross product value Cr, and updates the cross product value data De by using the cross product value Cr.

In step 63 and step 64 described above, the Z-axis component of the cross product between the acceleration projection vector Vto and the acceleration projection vector Vt, each of which is a three-dimensional vector, is set as a cross product value Cr. However, the cross product value Cr may be obtained in a similar manner by using other methods. For example, the acceleration projection vector Vt and the immediately preceding acceleration projection vector Vto are each defined as a two-dimensional vector on the projective plane. That is, the acceleration projection vector Vt is represented by Vt2 (LenXZ, AccY), and the immediately preceding acceleration projection vector Vto is represented by Vto2 (LenXZo, AccYo), and the two-dimensional vector for each vector is defined. The cross product between the two-dimensional vector Vto2 (LenXZo, AccYo) and the two-dimensional vector Vt2 (LenXZ, AccY) is defined as a cross product value Cr. That is, the cross product value Cr is calculated as follows.

$$Cr = Vto2 - Vt2 = LenXZo*LenXZ - AccYo*AccY$$

A result similar to that based on the above calculation method can be obtained.

Next, the CPU 10 updates the immediately preceding acceleration projection vector Vto by using the acceleration projection vector Vt calculated in step 62 (step 65), and ends the processing of the subroutine. Specifically, the CPU 10 updates the immediately preceding acceleration projection vector data Dd by using the acceleration projection vector Vt indicated by the acceleration projection vector data Dc.

With reference back to FIG. 15, after the cross product value calculation process in step 43, the CPU 10 performs a process of identifying a swing state (step 44), and advances the processing to a subsequent step. In the present embodiment, when a player performs a golf swing using the controller 7, the golf swing is divided into three swing states. For example, when a player performs a golf swing using the controller 7, the golf swing is divided into the following states: a state including addressing a ball, back-swinging, and a motion prior to down-swinging for hitting the ball (down-swing waiting state); a state including the down-swinging, hitting a ball, and a motion prior to finishing (follow-through) (shot-in-progress state); and a state including finishing and addressing for a next shot (stand-by state). Specifically, when the player holds the controller 7 and is in an address state, the state is set as the down-swing waiting state. Thereafter, at a time point when the magnitude of the acceleration applied to the controller 7 exceeds a predetermined value, the state shifts from the down-swing waiting state to the shot-in-progress state. After the shift to the shot-in-progress state, at a time point when reproduction of an animation showing the follow-through ends and the acceleration applied along the Y-axis direction becomes negative, then the state shifts from the shot-in-progress state to the stand-by state. Here, the reproduction of the animation showing the follow-through ends at a time point when the reproduction has completed up until a last animation frame. Further, after the shift to the stand-by state, at a time point when the front surface of the controller 7 is statically directed downwardly (e.g., when the controller 7 is in a static state and gravitational acceleration is applied in its Z-axis positive direction, or when the gravitational acceleration is applied in its Z-axis positive direction after the gravitational acceleration is applied in its Y-axis negative direction), the state shifts from the stand-by state to the down-swing waiting state.

Next, the CPU 10 determines, based on the result of the swing state identification process in step 44, whether or not a current swing state is the down-swing waiting state (step 45), and whether or not a current swing state is the shot-in-progress state (step 50). When the swing state is the down-swing waiting state, the CPU 10 advances the processing to step 46 subsequently. When the swing state is the shot-in-progress state, the CPU 10 advances the processing to step 51 subsequently. When the swing state is neither the down-swing waiting state nor the shot-in-progress state (i.e., the stand-by state), the CPU 10 advances the processing to step 52 subsequently.

In step 46, the CPU 10 performs processing of calculating a club angle, and advances the processing to step 47 subsequently. Hereinafter, with reference to FIG. 17, an operation of the club angle calculation process performed in above step 47 will be described in detail.

In FIG., the CPU 10 determines whether or not the controller 7 is in a dynamic state (step 81). When the controller 7 is in a dynamic state, the CPU 10 advances the processing to step 82 subsequently. On the other hand, when the controller 7 is in a static state, the CPU 10 advances the processing to step 83 subsequently. For example, in above step 81, the CPU 10 refers to histories h0 to h9 in acceleration data Da, calculates absolute values of the magnitude of acceleration in past 10 frames, and determines whether or not the absolute values stay within a range of 0.8G to 1.2G. When all the absolute values stay within the above range, the CPU 10 determines that the controller 7 is in a static state, whereas when at least one of the absolute values falls out of the above range, the CPU 10 determines that the controller 7 is in a dynamic state.

In step 82, the CPU 10 performs processing of calculating a dynamic angular acceleration, and advances the processing to step 84 subsequently. Hereinafter, with reference to FIG. 18, an operation of the dynamic angular acceleration calculation process performed in step 82 will be described in detail.

In FIG. 18, the CPU 10 determines whether or not the cross product value Cr indicated by the cross product value data De is less than a predetermined threshold a (step 101), and whether or not the cross product value Cr is greater than a predetermined threshold b (where, threshold b>threshold a) (step 102). When the cross product value Cr is less than the threshold a, the CPU 10 proceeds the processing to step 103 subsequently. When the cross product value Cr is greater than the threshold b, the CPU 10 advances the processing to step 104 subsequently. When the cross product value Cr is equal to or greater than the threshold a and equal to or smaller than the threshold b, the CPU 10 advances the processing to step 107 subsequently.

The thresholds a and b used in above step 101 and step 102 will be described. The thresholds a and b are values for determining whether the controller 7 is being swung upwardly or swung downwardly. For example, when threshold a=−0.01 is satisfied, and when the cross product value Cr is less then the threshold a, it is determined that the controller 7 is being swung upwardly. Further, when threshold b=0.05 is satisfied and when the cross product value Cr is greater than the threshold b, it is determined that the controller 7 is being swung downwardly. As described with reference to FIG. 13, when a trajectory of the end point of the acceleration projection vector is drawn in a circle shape, it is possible to identify the direction in which the controller 7 is swung in accordance with the direction in which the trajectory is drawn. Further, it possible to identify the direction in which the trajectory of the end point of the acceleration projection vector is drawn depending on whether the Z-axis component of the cross product between the acceleration projection vector Vto and the acceleration projection vector Vt is positive or negative, that is, whether the cross product value Cr is positive or negative.

In this manner, the direction in which the controller 7 is swung can be identified depending on whether the cross product value Cr is positive or negative. However, in above step 101 and step 102, a width between the threshold a and threshold b is set, and it is impossible to identify, in the width, the direction in which the controller 7 is swung. This width is set so as to eliminate effects of noise on the acceleration detected by the acceleration sensor 701 or to prevent frequent switching in determination between a swing-up and a swing-down when the acceleration shifts in the vicinity of the threshold. The above-described exemplary values of the threshold a and the threshold b satisfies |a|<|b|, and the values are set to be different absolute values. When the absolute values of the thresholds are lesser, a condition for determining that a player swings the controller in some direction can be quickly satisfied by using the threshold. That is, in accordance with the magnitude of the absolute values of the thresholds a and b, it is possible to adjust responsivity in determination of respective swinging directions in which the controller 7 is swung. For example, when the threshold a and threshold b have the above-described exemplary values, operation responsivity in the case where the controller 7 is swung upwardly is set higher, as compared to operation responsivity in the case where the controller 7 is swung downwardly. In this manner, in accordance with the responsivity to the operation of swinging the controller 7, the responsivity varying depending on the games, the magnitude of the absolute values of the thresholds a and b is adjusted, whereby it is possible to obtain an desirable operation responsivity in accordance with the direction in which the controller 7 is swung.

If the above-described effect is not expected, it is not necessary to arrange the width between the threshold a and the threshold b, where the direction in which the controller 7 is swung is not determined. That is, when the cross product value Cr is a positive value, it may be determined that the controller 7 is swung downwardly, whereas when the cross product value Cr is a negative value, it may be determined that the controller 7 is swung upwardly. In this case, when the acceleration shifts around a value 0, determination of swing-up and swing-down switches frequently, which means that the responsivity for determining the direction in which the controller 7 is swung is significantly improved.

In step 103, the CPU 10 determines that the controller 7 is swung upwardly. The CPU 10 then calculates an angular acceleration AgA in a swing-up direction (step 105), and advances the processing to step 108 subsequently. For example, the CPU 10 calculates the angular acceleration AgA by using the following formula.

$$AgA=(a-Cr)*c$$

Here, a is the above described threshold, and satisfies a=−0.01, for example. Further, c is a predetermined constant, and satisfies c=5.0, for example. The CPU 10 then updates the angular acceleration data Df by using the calculated angular acceleration AgA.

On the other hand, in step 104, the CPU 10 determines that the controller 7 is swung downwardly. The CPU 10 then calculates the angular acceleration AgA in a swing-down direction (step 106), and advances the processing to step 108 subsequently. For example, the CPU 10 calculates the angular acceleration AgA by using the following formula.

$$AgA=(b-Cr)*c$$

Here, b is the above-described threshold, and satisfies b 0.05. The CPU 10 then updates the angular acceleration data Of by using the calculated angular acceleration AgA.

Further, in step 107, the CPU 10 sets the angular acceleration AgA to 0, updates the angular acceleration data Df, and advances the processing to step 108 subsequently. Note that above step 107 is performed when the cross product value Cr is equal to or greater than the threshold a and equal to or less than the threshold b (e.g., equal to or greater than −0.01 and equal to or less than 0.05), that is, when the cross product value Cr is close to 0. In this case, it is considered that the controller 7 is operated by an other operation than the above-described swing-up and swing-down motions, and thus the CPU 10 sets the angular acceleration AgA to the value 0.

In step 108, the CPU 10 adjusts the value of the angular acceleration AgA so as to stay within a predetermined range, and ends the processing of the subroutine. For example, the CPU 10 adjusts the value of the angular acceleration AgA indicated by the angular acceleration data Df so as to stay within a range of −4.0 to 4.0. That is, when the value of the angular acceleration AgA is less than −4.0, the angular acceleration AgA is adjusted to −4.0, whereas when the value of the angular acceleration AgA is greater than 4.0, the angular acceleration AgA is adjusted to 4.0, whereby the angular acceleration data Df is updated.

With reference back to FIG. 17, in step 81, when it is determined that the controller 7 is in a static state, the CPU 10 performs a process of calculating static angular acceleration (step 83), and advances the processing to step 84 subsequently. Hereinafter, with reference to FIG. 19, an operation of the static angular acceleration calculation process performed in step 83 will be described in detail.

In FIG. 19, the CPU 10 determines whether or not the Z-axis component of the acceleration (acceleration AccZ indicated by the history h0 in the Z-axis direction acceleration data Da3) obtained in step 42 is greater than the Y-axis component of the acceleration (acceleration AccY indicated by the history h0 in the Y-axis direction acceleration data Da2) (step 111). When the acceleration AccZ is greater than the acceleration AccY, the CPU 10 advances the processing to step 112 subsequently. On the other hand, when the acceleration AccZ is equal to or less than the acceleration AccY, the CPU 10 advances the processing to step 114 subsequently.

In step 112, the CPU 10 adjusts the Z-axis component of the acceleration (acceleration AccZ) obtained in step 42 so as to stay within a predetermined range, and advances the processing to a subsequent step. For example, the CPU 10 adjusts the value of the acceleration AccZ indicated by the history h0 in the Z-axis direction acceleration data Da3 so as to stay within a range between −1.0 and 1.0. That is, when the value of the acceleration AccZ is less than −1.0, the acceleration AccZ is adjusted to −1.0, whereas when the value of the acceleration AccZ is greater than 1.0, the acceleration AccZ is adjusted to 1.0, whereby the history h0 of the Z-axis direction acceleration data Da3 is updated.

Next, the CPU 10 calculates a static angle AgS by using the acceleration AccZ (step 113), and advances the processing to step 116 subsequently. For example, assuming that the Z-axis component of the acceleration obtained in above step 42 is the Z-axis component of the gravitational acceleration applied to the controller 7, the CPU 10 calculates a static angle AgS of the controller 7 while the direction along which the gravitational acceleration is applied is set as the reference. Specifically, the CPU 10 calculates the static angle AgS by using the following formula.

$$AgS=\arccos(AccZ)$$

The CPU 10 updates the static angle data Dk by using the calculated static angle AgS.

On the other hand, in step 114, the CPU 10 adjusts the value of the Y-axis component of the acceleration (acceleration AccY) obtained in step 42 so as to stay within a predetermined range, and advances the processing to a subsequent step. For example, when the CPU 10 adjusts the value of the acceleration AccY indicated by the history h0 in the Y-axis direction acceleration data Dat so as to stay within a range between −1.0 and 1.0. That is, when the value of the acceleration AccY is less than −1.0, the acceleration AccY is adjusted to −1.0, whereas when the value of the acceleration AccY is greater than 1.0, the acceleration AccY is adjusted to 1.0, whereby the history h0 of the Y-axis direction acceleration data Da2 is updated.

Next, the CPU 10 calculates the static angle AgS by using the acceleration AccY (step 115), and advances the processing to step 116 subsequently. For example, assuming that the Y-axis component of the acceleration obtained in step 42 is the Y-axis component of the gravitational acceleration applied to the controller 7, CPU 10 calculates the static angle AgS of the controller 7 while the direction along which the gravitational acceleration is applied is set as the reference. Specifically, the CPU 10 calculates the static angle AgS by using the following formula.

$$AgS=90+\{180-\arccos(AccY)\}=270-\arccos(AccY)$$

The CPU 10 updates the static angle data Dk by using the calculated static angle AgS.

In step 116, the CPU 10 calculates the angular acceleration AgA of a club by using the static angle AgS, and ends the processing of the subroutine. For example, the CPU 10 calculates, in a virtual game world, the angular acceleration AgA of the club so as to be proportional to a difference between the static angle AgS indicated by the static angle data Dk and an angle Ago of a golf club C swung by a player character PC, the angle Ago having been calculated in immediately preceding processing. Specifically, the CPU 10 calculates the angular acceleration AgA by using the following formula.

$$AgA=(4/190)*(AgS-Ago)$$

The CPU then updates the angular acceleration data Df by using the calculated angular acceleration AgA.

With reference back to FIG. 17, after calculating the angular acceleration AgA in step 82 or step 83, the CPU 10 calculates the angular velocity AgV (step 84), and advances the processing to a subsequent step. For example, when the CPU 10 calculates the angular velocity AgV by using the following formula.

$$AgV=AgVo+AgA$$

The CPU then updates the angular velocity Dg by using the calculated angular velocity AgV. Here, AgVo is a value indicating the angular velocity AgV calculated in the immediately preceding processing, and may be obtained by referring to the immediately preceding angular velocity data Dh.

Next, the CPU 10 adds, to the angular velocity AgV, an effect of air resistance set in the virtual game world (step 85), and advances the processing to a subsequent step. For example, the CPU 10 multiplies the angular velocity AgV calculated in step 84 by a coefficient less than 1 (e.g., 0.97), whereby the effect of the air resistance is added to the angular velocity AgV. The CPU then updates the angular velocity data Dg by using the angular velocity AgV having the effect of the air resistance added thereto.

Next, the CPU 10 adjusts the value of the angular velocity AgV obtained in above step 85 so as to stay within a predetermined range (step 86), and advances the processing to a subsequent step. For example, the CPU 10 adjusts the value of the angular velocity AgV indicated by the angular velocity Dg so as to stay within a range between −6.0 and 6.0. That is, when the value of the angular velocity AgV is less than −6.0, the angular velocity AgV is adjusted to −6.0, whereas when the value of the angular velocity AgV is greater than the 6.0, the angular velocity AgV is adjusted to 6.0, whereby the angular velocity Dg is updated.

Next, the CPU 10 calculates the angle Ag of the golf club C swung by the player character PC by using the angular velocity AgV (step 87), and advances the processing to a subsequent step. For example, the CPU 10 calculates the angle Ag by using the following formula.

$$Ag=Ago+AgV$$

The CPU 10 then updates the angle data Di by using the calculated angle Ag. Here, Ago is a value indicative of the angle Ag calculated in the immediately preceding processing, and may be obtained by referring to the immediately preceding angle data Dj.

Next, the CPU 10 determines whether or not the value of the angle Ag obtained in step 87 stays within a predetermined range (step 88). The threshold used in above step 88 is set to an angle which is possibly formed by the golf club C swung by the player character PC in the down-swing waiting state, and it is determined, for example, whether or not the value of the angle Ag stays within a range of 60.0 to 250.0. When the value of angle Ag falls outside the range, the CPU 10 then advances the processing to step 89 subsequently. On the other hand, when the value of angle Ag stays within the range, the CPU 10 advances the processing to step 91 subsequently.

In step 89, the CPU 10 adjusts the value of the angle Ag obtained in above step 87 so as to stay within the above-described range, and advances the processing to a subsequent step. For example, the CPU 10 adjusts the value of the angle Ag indicated by the angle data Di so as to be in a range between 60.0 and 250.0. That is, when the value of the angle Ag is less than 60.0, the value of angle Ag is adjusted to 60.0, whereas when the value of the angle Ag is greater than 250.0, the value of angle Ag is adjusted to 250.0. The CPU 10 then updates the angle data Di.

Next, the CPU 10 sets the angular velocity AgV to 0 (step 90), and advances the processing to step 91 subsequently. The processing in step 90 is performed when the angle Ag calculated in above step 87 falls outside a range of angles which are possibly formed by the golf club C in the above-described down-swing waiting state. In this case, the angle of the golf club C swung by the player character PC is fixed at an upper limit angle or lower limit angle of the above-described range of angles which is possibly formed, such that the angle of the golf club C does not fall outside the range of angles. As a result, the angular velocity of the golf club C to be swung needs to be also set to 0. Therefore, the CPU 10 sets the angular velocity AgV to 0 in step 90, and updates the angular velocity Dg.

In step 91, the CPU 10 updates the immediately preceding angular velocity AgVo by using a current angular velocity AgV, updates the immediately preceding angle Ago by using a current angle Ag, and ends the processing of the subroutine. For example, the CPU 10 updates the immediately preceding angular velocity data Dh by using the angular velocity AgV indicated by the angular velocity Dg. In addition, the CPU 10 updates the immediately preceding angle data Dj by using the angle Ag indicated by the angle data Di.

With reference back to FIG. 15, after the club angle calculation process in step 46, the CPU 10 selects an animation frame corresponding to the angle Ag (step 47), and advances the processing to step 48 subsequently. For example, when the player character PC performs a golf swing, the player character image data Dm1 has prepared therein animation frames corresponding to respective angles of a golf club, the angles being formed by movement of the golf club ranging from an address and a back swing, to a top swing. The CPU 10 then selects, in step 47, an animation frame corresponding to the angle Ag indicated by the angle data Di from the player character image data Dm1.

On the other hand, in accordance with a result of the swing state identification process in above step 44, when the swing state is in the shot-in-progress state (Yes in step 50), the CPU 10 calculates an animation frame velocity (step 51), and advances the processing to step 48 subsequently. As described above, when the magnitude of the acceleration applied to the controller 7 exceeds a predetermined level of magnitude in the down-swing waiting state, the CPU 10 shifts the state to the shot-in-progress state. For example, in step 51, the CPU 10 calculates the animation frame velocity, based on an amount of change in acceleration at a time when the magnitude of the acceleration applied to the controller 7 exceeds the predetermined level of magnitude (for example, a difference between the Z-axis direction acceleration data obtained in the immediately preceding processing and the Z-axis direction acceleration data obtained in the current processing). Specifically, in the case where it is indicated, according to the amount of change in the acceleration at a time when the acceleration exceeds the predetermined level of magnitude, that a velocity of swinging the controller 7 downwardly is relatively high, the CPU 10 calculates the animation frame velocity so as to be relatively high.

Further, in accordance with a result of the swing state identification process in step 44, when the state is neither the down-swing waiting state nor the shot-in-progress state (that is, the stand-by state; No in step 45 and step 50), the CPU 10 selects an after-shot animation (step 52), and advances the processing to step 48 subsequently. As described above, at a time when, in the shot-in-progress state, reproduction of a follow-through animation ends and the acceleration along the Y-axis direction turns negative, the CPU 10 shifts the state to the stand-by state. For example, in step 52, when the reproduction of the follow-through animation ends and the acceleration along the Y-axis direction turns negative, the CPU 10 selects a finish-state animation, which shows the player character PC having finished swinging, from the player character image data Dm1. Further, in step 52, when, in the stand-by state, the player swings the controller 7 downwardly from the finish state toward a front downward direction (for example, when the gravitational acceleration is applied to the controller 7 in the static state in the Z-axis positive direction), the CPU 10 selects, from the player character image data Dm1, an animation which shows the player character PC bringing the golf club, in the finish state, to his/her front position.

In step 48, the CPU 10 performs a game display process to display the player character PC on the monitor 2, where the player character PC is caused to move in accordance with the setting of the animation performed in step 47, step 51, or step 52, and advances the processing to a subsequent step. For example, when an animation frame is selected in step 47, the CPU 10 selects, from the player character image data Dm1, an animation in accordance with the selected animation frame, and displays the animation frame on the monitor 2. Further, when the animation frame velocity is calculated in step 51, the CPU 10 reproduces an animation of the player character PC performing a shot, which is prepared in the player character image data Dm1, at the animation frame velocity, and displays the animation on the monitor 2. Still further, when the after-shot animation is selected in step 52, the CPU 10 selects the selected animation from the player character image data Dm1, and displays the animation on the monitor 2.

Next, the CPU 10 determines whether or not to end the game (step 49). The game may end, for example, when a condition for game over is satisfied, or when the player performs an operation to end the game. When the game does not end, the CPU 10 returns to step 42 and repeats the processing, whereas when the game ends, the processing in the flowchart ends.

In this manner, according to the above-described game process, a value of a cross product of pieces of acceleration vector, which are obtained in time-sequential order from the acceleration sensor 701, is calculated, and the direction in which the controller 7 is swung is determined by using the value of the cross product. Accordingly, it is possible to determine the direction accurately.

In the above description, whether the controller 7 is swung upwardly or swung downwardly by the player is identified by using the cross product value Cr. However, it is possible to identify the direction in which the controller 7 is swung even if the controller is swung in other directions. In the present invention, if the controller 7 is swung such that the acceleration vector time-sequentially obtained from the acceleration sensor 701 shifts in such a manner that the end point thereof draws a trajectory of a substantially circle shape (see FIG. 11 and FIG. 13), it is possible to identify the swing direction. For example, when the player swings the controller 7 in a right-left direction while directing an upper surface of the controller upwardly, the acceleration vector obtained time-sequentially from the acceleration sensor 701 shifts such that the end point thereof draws a trajectory of a substantially circle shape on a plane perpendicular to the Y-axis. In this case, when the projective plane is set parallel to the Y-axis, it is possible to accurately identify whether the player has swung the controller 7 to the left or to the light, based on the value of the cross product of the acceleration projection vector which is projected onto the projective plane and obtained time sequentially.

Further, in the above description, used in the processing is the acceleration sensor 701 for detecting acceleration along three axis directions, however, the controller 7 may be equipped with an acceleration sensor detecting acceleration along at least two axis directions. For example, suppose that the controller 7 is equipped with the acceleration sensor detecting acceleration along two axis directions. In such a case, when the controller 7 is swung so as to rotate about a direction perpendicular to the two axis directions, and the acceleration vector along the two axis direction shifts such that the end point thereof draws a trajectory of a substantially circle shape, then it is possible to identify the swing direction by distinguishing the direction in which the circle is drawn by using the value of the cross product.

Still further, in the above game process, an example has been employed where the present technology is used for determining a swing direction in a golf game. However, the present technology may be used for the acceleration data determination process which is performed in another game. The present technology is desirable, in a game which is based on the condition that the controller 7 is swung in a certain direction, such as a vertical direction, a horizontal direction, a direction from an upper left to a lower right, a direction from an upper right to a lower left, and the like, for determining whether the controller 7 is swung in the certain direction or in a direction reverse thereof. As a first example, when the controller 7 is held and swung like a tennis racket swung in a tennis game, a forehand swing and a backhand swing are distinguished from each other. As a second example, when the controller 7 is held and swung like a bat for a baseball game, a motion of the controller 7 until a swing for hitting a ball starts is identified. As a third example, when the controller 7 is held and swung like a sword used for a sword fighting game, a motion of the controller 7 until the controller is swung intensively by the player is identified.

Further, the present technology may be used for the acceleration data determination process performed in the information processing for those other than games. For example, the present technology may be used as the acceleration data determination processing performed for executing an exercise support program which encourages a user of the game apparatus 3 to swing the controller 7 and supports the user to perform an exercise.

Still further, in the above description, the golf game has been used in which, based on the determined swing direction, a player character PC in a three-dimensional virtual game space shoots a ball object BO. However, it is understood that the present technology is applicable to games of other types. For example, the present technology is applicable to a game in a two-dimensional virtual game world, in which a player character PC shoots a ball object BO.

Still further, in the above description, the present technology has been applied to a stationary game apparatus, however, the present technology may be applicable to an information processing apparatus such as a general personal computer or the like which is operated using an input device equipped with an acceleration sensor. It is possible to perform various game processes, based on acceleration applied to the input device. For example, in accordance with acceleration data outputted from the acceleration sensor of the input device, the information processing apparatus calculates the swing direction of the user holding the input device.

Further, in the above description, a case has been described where the controller 7 and the game apparatus body 5 are connected to each other by wireless communication, however, the controller 7 and the game apparatus body 5 may be electrically connected to each other via a cable. In this case, the cable connected to the controller 7 is connected to a connection terminal of the game apparatus body 5.

Still further, the shape of the controller 7, and the shapes, the numbers, and positions of the operation sections 72 provided thereto are merely examples, and any other shapes, numbers, and positions may be used to realize the present invention. Still further, the coefficients, the thresholds, the formulas, the processing orders, and the like used in the processing above are merely examples, and any other values, formulas, and processing orders may be used to realize the present invention.

Further, the game program of the present technology is not only provided to the game apparatus body 5 by means of an external storage medium such as the optical disc 4 or the like, but also may be provided to the game apparatus body 5 by means of a wireless or wired communication line. Further, the game program may be stored, in advance, in a nonvolatile storage device incorporated in the game apparatus body 5. As an information storage medium for storing the game program, a nonvolatile semiconductor memory may be used other than a disc-shaped optical storage medium such as a CD-ROM, a DVD, or the like.

While the technology presented herein has been described in detail, the foregoing description is in all aspects illustrative and not restrictive. It is understood that numerous other modifications and variations can be devised without departing from the scope of the present technology. It is should be understood that the scope of the present technology is interpreted only by the scope of the claims. It is also understood that, from the description of specific embodiments of the present technology, the one skilled in the art can easily implement the present technology in the equivalent range based on the description of the present technology and on the common technological knowledge.

Further, throughout the specification, it is understood that terms in singular form should include a concept of plurality. Thus, it should be understood that articles or adjectives indicating the singular form (e.g., "a", "an", "the", and the like in English) includes the concept of plurality unless otherwise specified. Further it should be understood that terms used in the present specification have meanings generally used in the art concerned unless otherwise specified. Therefore, unless otherwise defined, all the jargons and technical terms have the same meanings as those generally understood by one skilled in the art of the present technology. In the event of any confliction, the present specification (including meanings defined herein) has priority.

The storage medium having stored thereon the information processing program and the information processing apparatus according to the present technology are capable of accurately identifying the direction in which the input device is swung by using the acceleration applied to the input device, and are useful as an exercise supporting apparatus and an exercise supporting program which supports a user performing an exercise by using an operation of swinging the input device, and are further useful as a game apparatus and a game program, or the like which executes a game or the like by using an operation of swinging the input device.

What is claimed is:

1. A non-transitory computer readable storage medium having stored thereon an information processing program executed on a computer of an information processing apparatus which executes a process using acceleration data outputted from an acceleration sensor detecting acceleration along at least two axis directions applied to an input device, the information processing program causing the computer to perform:

data obtaining for repeatedly obtaining the acceleration data;

acceleration vector generation for generating first acceleration vector in accordance with first acceleration data obtained by the data obtaining, and for generating second acceleration vector in accordance with second acceleration data obtained by the data obtaining time-sequentially following the first acceleration data;

cross product direction calculation for calculating a direction of a cross product between the first acceleration vector and the second acceleration vector; and swing direction identification for identifying a swing direction in which the input device is swung in accordance with the direction of the cross product.

2. The non-transitory computer readable storage medium having stored thereon the information processing program according to claim 1, wherein the swing direction identification identifies the swing direction in which the input device is swung in accordance with whether the direction of the cross product is a first direction or a second direction that is reverse of the first direction.

3. The non-transitory computer readable storage medium having stored thereon the information processing program according to claim 2, wherein the swing direction identification identifies that the swing direction in which the input device is swung is a third direction when the direction of the cross product is the first direction, and identifies that the swing direction in which the input device is swung is a fourth direction, which is reverse of the third direction, when the direction of the cross product is the second direction.

4. The non-transitory computer readable storage medium having stored thereon the information processing program according to according to claim 1, wherein the cross product direction calculation includes cross product value calculation for calculating a cross product value indicative of a component of a cross product, in a predetermined direction, between the first acceleration vector and the second acceleration vector, and the swing direction identification identifies the swing direction in which the input device is swung in accordance with the cross product value.

5. The non-transitory computer readable storage medium having stored thereon the information processing program according to according to claim 4, wherein the swing direction identification identifies the swing direction in which the input device is swung in accordance with whether the cross product value is negative or positive.

6. The non-transitory computer readable storage medium having stored thereon the information processing program according to according to claim 3, wherein the cross product direction calculation includes:

cross product value calculation for calculating a cross product value indicative of a component of a cross product, in a predetermined direction, between the first acceleration vector and the second acceleration vector;

first threshold determination for determining whether or not the cross product value is less than a first threshold which is a negative value set in advance; and second threshold determination for determining whether or not the cross product value is greater than a second threshold which is a positive value and which has an absolute value different from the first threshold, the swing direction identification identifies that the swing direction in which the input device is swung is the third direction when the first threshold determination determines that the cross product value is less than the first threshold, and identifies that the swing direction in which the input device is swung is the fourth direction when the second threshold determination determines that the cross product value is greater than the second threshold.

7. The non-transitory computer readable storage medium having stored thereon the information processing program according to according to claim 6, wherein
when the first threshold determination determines that the cross product value is equal to or greater than the first threshold and when the second threshold determination determines that the cross product value is equal to or less than the second threshold, the swing direction identification identifies that the input device is not being swung.

8. The non-transitory computer readable storage medium having stored thereon the information processing program according to according to claim 1, wherein
the acceleration sensor detects acceleration along at least three axis directions applied to the input device, and outputs acceleration data corresponding to the acceleration, and
the acceleration vector generation sets a predetermined projective plane in a space defined by the three axes as coordinate axes, and projects first acceleration indicated by the first acceleration data and second acceleration indicated by the second acceleration data onto the projective plane, so as to generate the first acceleration vector and the second acceleration vector.

9. The non-transitory computer readable storage medium having stored thereon the information processing program according to according to claim 3, wherein
the acceleration sensor detects acceleration along at least three axis directions applied to the input device, and outputs acceleration data corresponding to the acceleration, and
the acceleration vector generation sets, in a space defined by the three axes as coordinate axes, a projective plane so as to be non-parallel to an axis of swing rotation supposedly defined for the input device swung in the third direction and in the fourth direction, and projects first acceleration indicated by the first acceleration data and second acceleration indicated by the second acceleration data, which are arranged in the space, onto the projective plane, and generates the first acceleration vector and the second acceleration vector.

10. The non-transitory computer readable storage medium having stored thereon the information processing program according to according to claim 9, wherein
the acceleration vector generation sets the projective plane, in the space, so as to be substantially perpendicular to the axis of swing rotation.

11. The non-transitory computer readable storage medium having stored thereon the information processing program according to according to claim 3, wherein
the acceleration sensor detects acceleration along at least three axis directions applied to the input device, and outputs acceleration data corresponding to the acceleration,
a trajectory of acceleration, which is detected by the acceleration sensor and is drawn in a space defined by the three axes as the coordinate axes when the input device is swung in the third direction, is drawn substantially in a circle shape, when projected onto a predetermined plane,
a trajectory of acceleration, which is detected by the acceleration sensor and is drawn in the space when the input device is swung in the fourth direction, is drawn, when projected onto the predetermined plane, substantially in a circle shape in a direction reverse of a direction of the trajectory obtained when the input device is swung in the third direction, and
the acceleration vector generation sets a projective plane so as to be substantially non-perpendicular to the predetermined plane, and projects first acceleration indicated by the first acceleration data and second acceleration indicated by the second acceleration data, which are arranged in the space, onto the projective plane, and generates the first acceleration vector and the second acceleration vector.

12. The non-transitory computer readable storage medium having stored thereon the information processing program according to according to claim 11, wherein
the acceleration vector generation sets the projective plane so as to be substantially parallel to the predetermined plane.

13. The non-transitory computer readable storage medium having stored thereon the information processing program according to according to claim 8, wherein
the acceleration vector generation generates the first acceleration vector by using a value obtained by projecting components of two axis directions, among components of the three axis directions of the first acceleration, onto the projective plane, and a value of a component of a remaining one axis direction, and generates the second acceleration vector by using a value obtained by projecting components of two axis directions of the second acceleration onto the projective plane, and a value of a component of a remaining one axis direction of the second acceleration.

14. The non-transitory computer readable storage medium having stored thereon the information processing program according to according to claim 4, further causing the computer to perform:
angle calculation for calculating an angle relative to a swing direction identified by the swing direction identification, in accordance with the cross product value calculated by the cross product value calculation; and
display control for arranging, in accordance with an angle calculated by the angle calculation, an object in a virtual world, at the angle, and displaying the object on a display device.

15. The non-transitory computer readable storage medium having stored thereon the information processing program according to according to claim 14, wherein
the angle calculation calculates an angular velocity in the swing direction identified by the swing direction identification, in accordance with the cross product value calculated by the cross product value calculation, and calculates the angle in accordance with the angular velocity.

16. The non-transitory computer readable storage medium having stored thereon the information processing program according to according to claim 15, wherein
the angle calculation calculates angular acceleration in the swing direction identified by the swing direction identification, in accordance with the cross product value calculated by the cross product value calculation, and calculates the angular velocity in accordance with the angular acceleration.

17. An information processing apparatus performing a process using acceleration data outputted from an acceleration sensor detecting acceleration along at least two axis direction applied to an input device, comprising:
a data obtaining unit for repeatedly obtaining the acceleration data;
an acceleration vector generation unit for generating first acceleration vector in accordance with first acceleration data obtained by the data obtaining unit, and for generating second acceleration vector in accordance with second acceleration data obtained by the data obtaining unit time-sequentially following the first acceleration data;
a cross product direction calculation unit for calculating a direction of a cross product between the first acceleration vector and the second acceleration vector; and
a swing direction identification unit for identifying a swing direction in which the input device is swung in accordance with the direction of the cross product.

18. An information processing system, including an input device and an information processing apparatus performing a process using acceleration data outputted from an acceleration sensor detecting acceleration along at least two axis direction applied to the input device, comprising:
a data obtaining unit for repeatedly obtaining the acceleration data; and
a processing system, including one or more computer processors, configured to:
generate a first acceleration vector in accordance with first acceleration data obtained by the data obtaining unit, and generate a second acceleration vector in accordance with second acceleration data obtained by the data obtaining unit time-sequentially following the first acceleration data;
calculate a direction of a cross product between the first acceleration vector and the second acceleration vector; and
identify a swing direction in which the input device is swung in accordance with the direction of the cross product.

19. A computer-implemented method for executing a process using acceleration data outputted from an acceleration sensor detecting acceleration along at least two axis directions applied to an input device, the method comprising:
repeatedly obtaining the acceleration data;
generating a first acceleration vector in accordance with obtained first acceleration data, and generating a second acceleration vector in accordance with obtained second acceleration data time-sequentially following the first acceleration data;
calculating, via one or more computer processors, a direction of a cross product between the first acceleration vector and the second acceleration vector; and
identifying a swing direction in which the input device is swung in accordance with the direction of the cross product.

* * * * *